(12) United States Patent
Okamura et al.

(10) Patent No.: US 11,613,129 B2
(45) Date of Patent: Mar. 28, 2023

(54) AQUEOUS INK, INK CARTRIDGE AND INK JET RECORDING METHOD

(71) Applicant: CANON KABUSHIKI KAISHA, Tokyo (JP)

(72) Inventors: Daiji Okamura, Tokyo (JP); Naotoshi Miyamachi, Tokyo (JP); Hiromitsu Kishi, Kawasaki (JP); Keisuke Inui, Kawasaki (JP); Hirohiko Yuasa, Kawasaki (JP); Naofumi Shimomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 16/916,252

(22) Filed: Jun. 30, 2020

(65) Prior Publication Data

US 2021/0001636 A1 Jan. 7, 2021

(30) Foreign Application Priority Data

Jul. 1, 2019 (JP) ............................. JP2019-122709
Jul. 1, 2019 (JP) ............................. JP2019-122710
May 27, 2020 (JP) ............................. JP2020-092292

(51) Int. Cl.
*B41J 2/175* (2006.01)
*B41M 5/00* (2006.01)
(Continued)

(52) U.S. Cl.
CPC ........ *B41J 2/17553* (2013.01); *B41M 5/0023* (2013.01); *C09D 11/102* (2013.01); (Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,681,381 A * 10/1997 Auslander ................ B41M 3/06
347/100
9,169,413 B2 10/2015 Shiiba et al.
(Continued)

FOREIGN PATENT DOCUMENTS

JP 2005068381 A 3/2005
JP 2005097347 A 4/2005
(Continued)

OTHER PUBLICATIONS

European Search Report issued in corresponding European Application No. 20182630.2 dated Nov. 16, 2020.

*Primary Examiner* — Manish S Shah
(74) *Attorney, Agent, or Firm* — Venable LLP

(57) ABSTRACT

The aqueous ink for ink jet contains a resin particle dyed with a fluorescent dye, and a water-soluble resin. The fluorescent dye contains a fluorescence-emitting dye selected from the group consisting of basic dye, disperse dye and oil-soluble dye, the resin particle has a core portion that contains an aromatic group-containing unit and cyano group-containing unit, and a shell portion that contains an aromatic group-containing unit, an anionic group-containing unit and a crosslinking agent-derived unit, but free of cyano group-containing unit, percentage (% by mass) of the crosslinking agent-derived unit in the shell portion is 30% by mass or more to 80% by mass or less, the water-soluble resin having an aromatic group-containing unit and an anionic group-containing unit, and the water-soluble resin having an acid value of 100 mgKOH/g or more to 180 mgKOH/g or less.

20 Claims, 2 Drawing Sheets

(51) Int. Cl.
    *C09D 11/107* (2014.01)
    *C09D 11/328* (2014.01)
    *C09D 11/102* (2014.01)
    *C09D 11/106* (2014.01)
    *C09D 11/50* (2014.01)

(52) U.S. Cl.
    CPC .......... *C09D 11/106* (2013.01); *C09D 11/107* (2013.01); *C09D 11/328* (2013.01); *C09D 11/50* (2013.01)

(58) Field of Classification Search
    CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 9,452,608 | B2 | 9/2016 | Okamura et al. |
| 9,738,803 | B2 | 8/2017 | Horiuchi et al. |
| 9,988,541 | B2 | 6/2018 | Shimomura et al. |
| 10,125,284 | B2 | 11/2018 | Gouda et al. |
| 10,131,806 | B2 | 11/2018 | Hayashi et al. |
| 10,253,197 | B2 | 4/2019 | Shiiba et al. |
| 2004/0006158 | A1* | 1/2004 | Horie ..................... C09D 11/36 430/114 |
| 2013/0141498 | A1* | 6/2013 | Mori ..................... B41J 2/2107 347/100 |
| 2014/0092168 | A1* | 4/2014 | Ito ..................... B41J 2/16552 106/31.86 |
| 2016/0340530 | A1* | 11/2016 | Horiuchi ............. B41J 2/17503 |
| 2017/0335122 | A1* | 11/2017 | Shimomura .......... B41J 2/1752 |
| 2019/0100669 | A1* | 4/2019 | Murai ................. B41M 5/0023 |
| 2021/0001656 | A1* | 1/2021 | Wakao ................ B41M 5/0023 |

FOREIGN PATENT DOCUMENTS

| | | |
|---|---|---|
| JP | 2007203538 A | 8/2007 |
| JP | 2009-161688 A | 7/2009 |
| WO | 2015/158649 A1 | 10/2015 |

\* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge, and an ink jet recording method.

Description of the Related Art

Printing industry has been seeking expansion of color gamut that can be expressed. Known standards regarding color gamut include PANTONE Certification (X-rite), Japan Color Certification (Japan Printing Machinery Association), DIC Color Guide Certification (DIC) and Kaleido Certification (Toyo Ink Co., Ltd.). Recent trend for expanding color gamut relates to use of an ink jet recording apparatus that employs spot color inks or high-lightness special color inks, other than inks of basic colors consisting of cyan, magenta and yellow.

One of other needs in the printing industry relates to creation of recorded articles with eye-catching vivid colors. For example, notices such as poster and POP advertisement, or packages of foods and beverages need to be recorded with vivid colors in order to catch the eyes of consumers. From the viewpoint of satisfying such need, fluorescent colors are considered to be beneficial. There has been proposed a fluorescent material suitable for paint or ink (Japanese Patent Application Laid-Open No. 2009-161688). The current situation has, however, not arrived at the goal of fluorescent material with satisfiable ink jet property.

Offset printing is the current mainstream of method for recording images in fluorescent colors. The offset printing is, however, difficult to achieve excellent color developability in fluorescent colored images by just-once printing, so that it has been a common practice to repeat over-printing twice or more number of times. Hence the method for recording fluorescent images with excellent color developability, repeated over-printing multiple number of times, has been disadvantageous in terms of productivity and cost.

Digital recording based on an electrophotographic system might otherwise be successful in recording images with highly vivid colors, through the use of a liquid toner. The electrophotographic system is, however, restrictive about the recording medium, so that the recording is applicable only with difficulty onto textile, large area or thick material.

In contrast, digital recording based on the ink jet system is applicable to various kinds of recording medium, by virtue of its non-contact nature that the recording head, through which the ink is ejected, does not come into contact with the recording medium. Note, however, that the ink jet system is designed to eject the ink through a micrometer-sized fine nozzle, under mechanical energy or heat energy applied thereto, and is therefore susceptible to physical properties of the ink such as viscosity. In particular, many of materials that govern the properties of ink, such as coloring material and resin, are solid, and are necessarily dissolved or dispersed in a liquid medium such as water or organic solvent before being added to the ink, posing a restriction on the amount of addition to the ink. The same situation will occur in fluorescent coloring material such as fluorescent dye, so that any effort to add a sufficient amount of fluorescent coloring material to the ink, aiming at recording images with excellent color developability, will be restricted by physical properties of the ink.

It is therefore an object of the present invention to provide an aqueous ink capable of producing a fluorescent-colored image with excellent color developability, and excels in ejection stability and sticking recoverability. It is another object of the present invention to provide an ink cartridge and an ink jet recording method using such aqueous ink.

SUMMARY OF THE INVENTION

According to the present invention, there is provided an aqueous ink for ink jet, which includes a resin particle dyed with a fluorescent dye, and a water-soluble resin, the fluorescent dye containing a fluorescence-emitting dye selected from the group consisting of basic dye, disperse dye and oil-soluble dye, the resin particle having a core portion that contains an aromatic group-containing unit and a cyano group-containing unit, and a shell portion that contains an aromatic group-containing unit, an anionic group-containing unit and a crosslinking agent-derived unit, but free of cyano group-containing unit, percentage (% by mass) of the crosslinking agent-derived unit in the shell portion being 30% by mass or more to 80% by mass or less, the water-soluble resin having an aromatic group-containing unit and an anionic group-containing unit, and the water-soluble resin having an acid value of 100 mgKOH/g or more to 180 mgKOH/g or less.

The present invention can successfully provide an aqueous ink capable of recording a fluorescent-colored image with excellent color developability, and excels in ejection stability and sticking recoverability. The present invention can also successfully provide an ink cartridge and an ink jet recording method using such aqueous ink.

Further features of the present invention will become apparent from the following description of exemplary embodiments with reference to the attached drawings.

DESCRIPTION OF THE EMBODIMENTS

Figure 1:
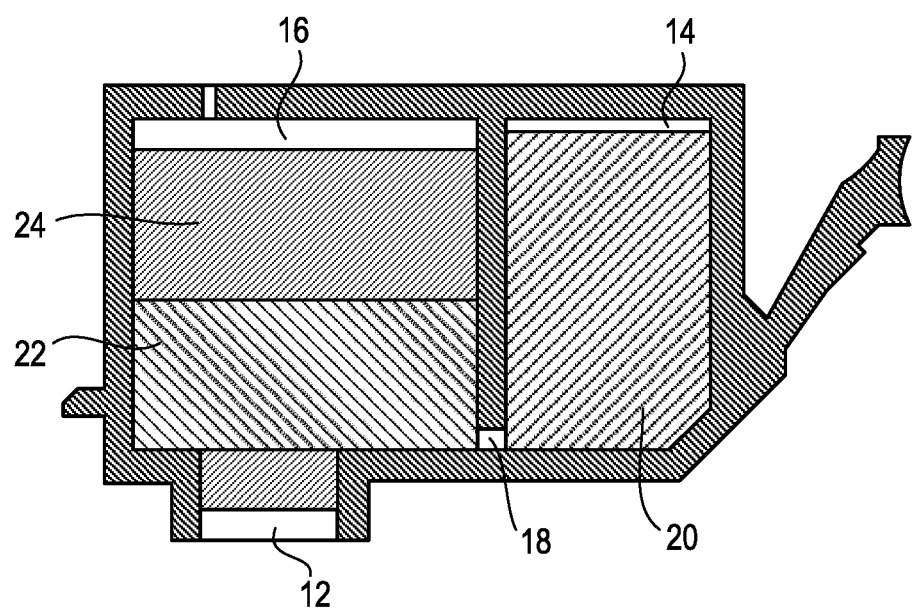
FIG. 1 is a cross sectional view schematically illustrating an embodiment of the ink cartridge of the present invention.

The present invention will further be detailed, referring to preferred embodiments. In the present invention, any compound in the form of salt, although dissociates to produce ions in the ink, will be referred to as "contains a salt" for convenience sake. The aqueous ink for ink jet may be occasionally and simply referred to as "ink". Physical data are those observed at normal temperature (25° C.) unless otherwise specifically noted. In the present invention, the "unit" that constitutes the resin means a repeating unit derived from a single monomer.

The present inventors investigated into compositions of ink capable of recording fluorescent-colored images that excel in color developability, and suitable for ink jet (ejection stability, and sticking recoverability indicating easiness of unclogging of ejection orifice). In pursuit of improving the color developability of image, the present inventors placed stress on expansion of color gamut in high lightness region which cannot be expressed easily only with the basic colors. Use of fluorescence-emitting dyes as the coloring material is beneficial for expanding the color gamut in the high lightness region.

The present inventors made a trial of adding the fluorescent dye per se to the ink. Increase of the amount of addition of the fluorescent dyes, aiming at attaining desired levels of color developability, was found to improve chroma, but to remarkably degrade lightness. This is supposedly due to concentration quenching characteristic of fluorescent materials. As a matter of course, the images did not demonstrate water-resistance. Considering the above, it was found essential to make the fluorescent dye adhered to the resin particle. The fluorescent dye, when adhered to the resin particle, is consequently fixed on the resin particle, and can thereby suppress the lightness of images from degrading, and can improve the water resistance of images.

Common methods for dying the resin particle with the fluorescent dye to the resin particle include (i) a method called addition-condensed bulk resin crushing by which a bulk resin is condensed, dyed and then crushed to obtain particle; and (ii) a method of dyeing the resin particle in an aqueous system by emulsion polymerization. The resin particle obtainable by method (i) measures micrometers in diameter, and is less dispersible in water, proving it to be not easily applicable to the ink for the ink jet recording method. In contrast, the resin particle obtainable by method (ii) is applicable to aqueous system, and the size thereof may be controlled into nanometers, proving it to be suitable for ink jet. Investigations by the present inventors into color developability and reliability of inks that contains the prior resin particle manufactured by method (ii), however, revealed several problems.

The present inventors then investigated into color developability of image recorded with the ink that contains the resin particle having adhered thereto the fluorescent dye. For enhanced color developability of image, it is critical to dye the resin with the fluorescent dye through strong interaction. Hence, the present inventors investigated into structure of the resin particle that dyes well with the fluorescent dye, depending on characteristics of the fluorescent dye.

First, the present inventors investigated into dyeing of the resin with the fluorescent dye on the basis of electrostatic interaction between cation and anion, using a fluorescent dye having a positively polarized part, and a resin having an anionic group-containing unit. It is typically considered that a resin particle composed of a basic dye containing a cationic part, and a resin containing an anionic group-containing unit or a cyano group-containing unit is preferably used. Note however that large content of the anionic group-containing unit would excessively increase hydrophilicity of the resin, and would thereby inhibit formation of the resin particle. Meanwhile, the cyano group-containing unit will not cause such problem, and is considered to be a unit suitable for forming the resin particle.

Next, the present inventors investigated into dyeing of the resin with the fluorescent dye, making use of hydrophobic interaction or dipolar interaction. More specifically, the present inventors investigated into use of a disperse dye or oil-soluble dye, which is a substantially water-insoluble fluorescent dye having a hydrophobic moiety represented by aromatic group, in combination with the resin particle that contains the aromatic group-containing unit and the polar cyano-group containing unit. The fluorescent dye can be stably adhered to the resin particle on the basis of hydrophobic interaction between the fluorescent dye and a hydrophobic group of the resin particle, and additionally on the basis of dipolar interaction between a high-polarity part that resides on a nitrogen atom, sulfur atom or oxygen atom in the molecule of the fluorescent dye, and a cyano group in the resin particle. In addition to these actions, the disperse dye or oil-soluble dye, especially having an aromatic group, will demonstrate π-π interaction with the aromatic group of the resin particle.

Cyano group was, however, found to easily degrade the sticking recoverability of the ink, since the group has large polarity and is ready to interact with many ingredients in the water-containing ink. The aqueous ink for ink jet, even if condensed due to moisture evaporation through an ejection orifice, is maintained to enable normal ejection by preliminary ejection, or by recovering operation such as cap-aided suction and pressurizing. Even such recovering operation would, however, fail to recover the normal state, if the solid matter such as the resin particle aggregates and becomes hard to re-disperse, consequently inhibiting normal ejection of the ink.

Once the resin particle containing the cyano group-containing unit is dried to solidify, the resin particle almost cannot be re-dispersed even with addition of an aqueous medium. In the condensed ink remained after moisture evaporation, cyano group of the resin particle strongly interacts with high polarity components (water and water-soluble organic solvent), and this supposedly inhibits the re-dispersion. The present inventors investigated into composition of the ink that excels in sticking recoverability, even if containing the resin particle having the cyano group-containing unit. The present inventors consequently found that use of the resin particle having a core-shell structure, and employment of the cyano group-containing unit only in the core portion, can improve the sticking recoverability of the ink, while enhancing the color developability of image. The present inventors also found importance of the aromatic group-containing units contained both in the core portion and the shell portion. The sticking recoverability is suppressed from being degraded, supposedly because the core portion and the shell portion are brought into tight contact assisted by hydrophobic interaction and π-π interaction among the aromatic groups.

Ejection stability of the ink was, however, found to remain less stable, despite employment of the resin particle having such core-shell structure. For the purpose of moisturizing the resin particle with the aqueous medium in the ink, the anionic group-containing unit is necessarily incorporated into the shell portion. Investigations revealed that the ejection stability of the ink can hardly be improved by controlling the content of the anionic group-containing unit in the resin particle. That is, with the anionic group-containing unit, whose content is sufficient for the ejection stability of the ink, incorporated into the shell portion, the shell portion will be too hydrophilic to thoroughly cover the core portion, resulting in exposure of cyano group of the core portion. As a consequence, such exposed cyano group will strongly interact with the high polarity ingredients, supposedly degrading the ejection stability of the ink.

The anionic group of the shell portion is ready to interact with cyano group of the core portion. Hence, the anionic group of the shell portion preferably resides in the surficial region of the shell portion, expected to contribute to dispersion stability of the resin particle. The anionic group of the shell portion can, however, be attracted in practice by cyano group of the core portion, and is ready to be drawn inside the shell portion. Hence, the resin particle having cyano group in the core portion thereof requires a larger amount of anionic group-containing units in the shell portion in order to maintain the ejection stability of the ink, as compared with the prior resin particle having the core-shell structure. This excessively enhances the hydrophilicity of the shell portion, and supposedly makes it difficult for the shell portion to fully cover the core portion. As has been described above, it is difficult to improve the ejection stability of the ink, solely by modification of the chemical composition of the resin particle having the core-shell structure.

Further investigations by the present inventors revealed that the ejection stability of the ink can be improved by adding thereto the water-soluble resin that contains the aromatic group-containing unit and the anionic group-containing unit. The aromatic group of the water-soluble resin and the aromatic group of the resin particle take part in hydrophobic interaction and π-π interaction, allowing the water-soluble resin to adsorb to the resin particle. Accordingly, the water-soluble resin supposedly assists dispersion of the resin particle.

Also revealed was improvement of the color developability of image, as a result of addition of the water-soluble resin to the ink. The basic dye is adhered to the resin particle, through interaction with cyano group of the core portion. Meanwhile, the disperse dye and the oil-soluble dye are adhered to the resin particle, through interaction of the high polarity part of the dye molecule, with cyano group of the core portion. The present inventors confirmed that use of the cyano group-containing resin particle can make the fluorescent dye (basic dye, disperse dye, oil-soluble dye) stay adhered to the resin particle also in the ink. It was, however, found that when the ink, using therein the anionic group-containing water-soluble resin in combination with the dyed resin particle, is stored for a long period, a part of the fluorescent dye can be released from the resin particle due to electrostatic interaction with the anionic group of the water-soluble resin, and can migrate towards the vicinity of the water-soluble resin.

The present inventors investigated into any difference in behaviors of the fluorescent dye, depending on presence and absence of the water-soluble resin. An ink containing the water-soluble resin and an ink free of such resin were examined by density gradient centrifugation which is employed as a simple method for separating the ingredients of the ink. The result revealed that the ink containing the water-soluble resin not only showed a colored layer in a resin particle layer, but also a colored layer attributable to the dye in a water-soluble resin layer. In contrast, the ink free of the water-soluble resin showed only a colored layer in the resin particle layer. This proves migration of a part of the fluorescent dye towards the vicinity of the water-soluble resin.

With a part of the fluorescent dye migrated from the resin particle towards the vicinity of the water-soluble resin, the dyed resin particle will have a reduced content of the fluorescent dye. The present inventors prepared a plurality of dyed resin particles with different contents of fluorescent dye, and also prepared inks using these resin particles. Evaluation of color developability of image recorded using the thus prepared inks revealed that the images recorded with the inks having smaller contents of the fluorescent dye in the resin particle tend to demonstrate higher lightness. The images recorded with the inks having smaller contents of the fluorescent dye in the resin particle demonstrate higher lightness, supposedly due to "concentration quenching" characteristic of the fluorescent dye. Excessively large density of the fluorescent dye in the system tends to cause interference between excitation light and fluorescence of the dye molecule, and this tends to cancel its intrinsically vivid color developability. Meanwhile, low density of the fluorescent dye in the system is less likely to cause the interference, successfully keeping the intrinsic vivid color developability. In short, it was considered that a part of the fluorescent dye having been adhered to the resin particle migrated towards the vicinity of the water-soluble resin to reduce the content of the fluorescent dye in the resin particle, and thereby the concentration quenching was suppressed, and the lightness of images increased. Since the amount of fluorescent dye in the ink was kept constant, so that the color developability could be improved while keeping the lightness of images unchanged.

In addition, the resin particle-containing ink, after being added with the water-soluble resin, was found to improve the ejection stability and color developability of image, but to degrade the sticking recoverability. Ions derived from the anionic group of the water-soluble resin can neutralize the anionic group in the shell portion of the resin particle, and thereby the hydrophilicity of the shell portion can be enhanced. This supposedly loosens the coverage of the core portion with the shell portion, and makes cyano group of the core portion more likely to expose, thereby degrading the sticking recoverability. The degree of sticking recoverability was found to depend on acid value of the water-soluble resin, wherein the larger the acid value of the water-soluble resin, the poorer the sticking recoverability.

Investigations revealed that the water-soluble resin necessarily has an acid value of 100 mgKOH/g or more, for improved ejection stability. Meanwhile, with the acid value of the water-soluble resin equal to or more than 100 mgKOH/g, the sticking recoverability tends to degrade as described previously. The present inventors then investigated into requirements for more tight coverage over the core portion with the shell portion. The present inventors finally conceived of an idea to incorporate a crosslinking agent-derived unit into the shell portion, and to set the percentage (% by mass) of the crosslinking agent-derived unit in the shell portion to 30% by mass or more. This makes cyano group of the core portion less likely to expose, and can suppress the sticking recoverability from degrading. Meanwhile, with the percentage (% by mass) of the crosslinking agent-derived unit set more than 80% by mass, the ejection stability will degrade. In addition, with the acid value of the water-soluble resin set more than 180 mgKOH/g, the anionic group of the shell portion is remarkably promoted to cause hydration, irrespective of the percentage of the crosslinking agent-derived unit. Hence the coverage of the core portion by the shell portion will become more likely to loosen, and will not be able to suppress the sticking recoverability from degrading. Note that the resin particle-containing ink, when added with another resin particle having the aromatic group-containing unit and the anionic group-containing unit, rather than the water-soluble resin, will improve the color developability, but will fail to improve the ejection stability of the ink.

<Aqueous Ink>

The ink of the present invention is an aqueous ink for ink jet, which contains a resin particle dyed with a fluorescent dye, and a water-soluble resin. The fluorescent dye contains a fluorescence-emitting dye selected from basic dye, disperse dye and oil-soluble dye. The resin particle has the core portion that contains an aromatic group-containing unit and a cyano group-containing unit, and the shell portion that contains the aromatic group-containing unit, the anionic group-containing unit and the crosslinking agent-derived unit, but free of the cyano group-containing unit. Percentage (% by mass) of the crosslinking agent-derived unit in the shell portion is 30% by mass or more to 80% by mass or less. The water-soluble resin has the aromatic group-containing unit and the anionic group-containing unit. The water-soluble resin has an acid value of 100 mgKOH/g or more to 180 mgKOH/g or less. The individual components constituting the ink will be explained below. The present invention is by no means limited by the description below, without departing from the spirit thereof. In the description below, "(meth)acrylic acid", "(meth)acrylate" and "(meth)acryloyl" means "acrylic acid, methacrylic acid", "acrylate, methacrylate" and "acryloyl, methacryloyl", respectively. The ink of the present invention is not necessarily an active energy ray curable one, and does not necessarily have any monomer having a polymerizable group.

(Fluorescent Dye)

The "fluorescent dye" in this patent specification means a dye that emits fluorescence with the aid of excitation light in the ultraviolet or visible region. Whether a certain dye is a "fluorescent dye" that emits fluorescence or not may be determined, for example, by the method below. A dye is dissolved in a liquid capable of solubilizing the dye, and the obtained sample is irradiated with ultraviolet radiation (UV light) in a long wavelength range (approximately 315 to 400 nm) which is slightly visible, using a black light or the like. If any spectral color different from the UV light irradiated by the black light can be visually observed, such dye is determined to be "fluorescent dye" that emits fluorescence. The black light employable here may be commercially available (Trade name "SLUV-4", from AS ONE Corporation, for example).

The fluorescent dye in the resin particle dyed with the fluorescent dye may be analyzed typically according to the procedures below. The resin particle separated from the ink by a common method is dissolved in an organic solvent such as chloroform, to thereby prepare a sample. The fluorescent dye is isolated from the thus prepared sample by HPLC (high performance liquid chromatography). The isolated dye is analyzed by a common method of structural analysis such as nuclear magnetic resonance (NMR) or matrix-assisted laser desorption/ionization mass spectrometry (MALDI-MS).

The basic dye is a fluorescence-emitting compound having amino group or imino group (also the salt form acceptable) in the molecular structure thereof. The compound having amino group or imino group in the molecular structure thereof is typically exemplified by "dyes having BASIC in their generic names listed in the Color Index". The Color Index is a database of coloring materials constructed by The Society of Dyers and Colourists and other party. Skeletons of the dyes are exemplified by those of xanthene, azine, azole, thiazole, azo, diarylmethane, triarylmethane, acridine, coumarin and methine. Among them, the compounds having skeletons such as xanthene and coumarin are preferred, and the compound having xanthene skeleton is more preferred.

Specific examples of the fluorescence-emitting basic dyes, enumerated by the C.I. numbers or generic names, include C.I. Basic Red 1, 1:1, 2, 4, 8, 11, 12 and 13; C.I. Basic Violet 1, 3, 10, 11, 11:1 and 14; Rhodamine 19 and 575; C.I. Basic Yellow 1, 2, 9, 13, 24, 37, 40 and 96; C.I. Basic Blue 7; C. I. Basic Green 1; and C.I. Fluorescent Brightener 363. Among them, preferred are C. I. Basic Red 1 and 1:1; C. I. Basic Violet 11 and 11:1; and C.I. Basic Yellow 40, for their excellent color developability.

The disperse dye is a fluorescence-emitting compound less soluble or insoluble to water. The disperse dye is typically exemplified by "dyes having DISPERSE in their generic names listed in the Color Index". Skeletons of the dyes are exemplified by those of azo, coumarin and anthraquinone. Among them, the compounds having skeletons such as coumarin and anthraquinone are preferred, and the compound having coumarin skeleton is more preferred.

Specific examples of the fluorescence-emitting disperse dyes, enumerated by the C. I. numbers, include C.I. Disperse Yellow 82 and 186; C.I. Disperse Red 58 and 60; and C.I. Disperse Orange 11. Among them, C.I. Disperse Yellow 82 is preferred for its excellent color developability.

The oil soluble dye is a fluorescence-emitting compound less soluble or insoluble to water. The oil soluble dye is exemplified by "dyes having SOLVENT in their generic names listed in the Color Index". Skeletons of the dyes are exemplified by those of coumarin, xanthene, azo, aminoketone and anthraquinone. Among them, the compounds having skeletons such as coumarin and xanthene are preferred, and the compound having coumarin skeleton is more preferred.

Specific examples of the fluorescence-emitting oil soluble dyes, enumerated by the C.I. numbers, include C.I. Solvent Yellow 7, 43, 44, 85, 98, 131, 160:1, 172 and 196; C.I. Solvent Red 43, 44, 45, 49 and 149; and C.I. Solvent Orange 5, 45, 63 and 115. Among them, C.I. Solvent Yellow 160:1 and 196 are preferred for their excellent color developability.

The fluorescent dye preferably contains two or more kinds of fluorescent dyes. With the plurality of fluorescent dyes contained in the resin particle, the fluorescent dyes may be prevented from crystallizing, and can efficiently interact with the resin particle at the molecular level, and thereby kept adhered stably.

Content (% by mass) of the fluorescent dye in the ink is preferably 0.1% by mass or more to 5.0% by mass or less based on the total mass of ink. Percentage (% by mass) of the fluorescent dye in the resin particle is preferably 1.0% by mass or more to 15.0% by mass or less, and more preferably 4.0% by mass or more to 8.0% by mass or less. Too small percentage of the fluorescent dye in the resin particle would slightly degrade the color developability (chroma) of images. Meanwhile, too large percentage of the fluorescent dye in the resin particle would slightly degrade the color developability (chroma) of images due to concentration quenching.

(Resin Particle)

The "resin particle" in the context of this patent specification means a resin dispersible in an aqueous medium, and can stay in the aqueous medium while keeping the particle size. Hence, the resin particle can stay dispersed in the ink, that is, in the form of resin emulsion.

Whether a certain resin is "resin particle" or not may be determined by the method below. First, prepared is a liquid in which a resin is neutralized with an alkali (sodium hydroxide, potassium hydroxide, etc.) whose content is equivalent to the acid value (solid resin content: 10% by mass). Next, the prepared liquid is diluted 10-fold (volume basis) with pure water to prepare a sample solution. If the sample solution, when observed by dynamic light scattering, showed the resin particle with measurable size, such resin particle may be determined to be the "resin particle". For the dynamic light scattering, employable is a particle size distribution analyzer (Trade name "UPA-EX150" from Nikkiso Co., Ltd., for example). Typical measurement conditions in this process include Set-Zero time: 30 seconds, number of runs: 3, measurement time: 180 seconds, shape: sphere and refractive index: 1.59. The particle size distribution analyzer and the measurement conditions to be employed are, of course, not limited to those described above. Use of the neutralized resin for the measurement of particle size is for the purpose of confirming whether the resin, having been made less likely to form the particle after neutralization, can still form the particle or not. The resin capable of keeping the particle form even under such condition can stay as the particle also in the aqueous ink.

The resin particle employed here has the core portion, and the shell portion that covers the core portion, which is so-called core-shell structure. The core portion has the aromatic group-containing unit and the cyano group-containing unit. With the core portion containing therein the aromatic group-containing unit and the cyano group-containing unit, the aforementioned various types of interaction between the fluorescent dye and the resin particle will be enhanced. Hence, the resin particle can be efficiently dyed with the fluorescent dye, enabling the fluorescent dye to efficiently demonstrate its specific color developability, and thereby improving the color developability of image. The resin particle formed of acrylic resin is preferably used.

The shell portion has the aromatic group-containing unit, the anionic group-containing unit and the crosslinking agent-derived unit. The shell portion contains substantially no cyano group-containing unit. With the shell portion containing substantially no cyano group-containing unit, the resin particle will have substantially no cyano group on the surface thereof, and thereby the ink will successfully have improved sticking recoverability. If the highly polar cyano group should expose on the surface of the resin particle, the cyano group will interact with water or the water-soluble organic solvent in the ink. Interaction of the cyano group with water and so forth makes the resin particle likely to form a film and less likely to re-disperse, and consequently degrades the sticking recoverability of the ink.

The shell portion, containing the aromatic group-containing unit, can cause hydrophobic interaction and n-n interaction with the aromatic group in the core portion. This makes the shell portion less likely to separate from the core portion, and makes the cyano group of the core portion less likely to expose on the surface of the resin particle, so that the sticking recoverability improves. The aromatic group-containing unit contained in the core portion, and the aromatic group-containing unit contained in the shell portion are preferably units of the same kind. "Units of the same kind" means that they are derived from the same monomer. With the aromatic group-containing unit contained in the core portion and the aromatic group-containing unit contained in the shell portion being the units of the same kind, the core-shell interaction will further be enhanced, and thereby the sticking recoverability of the ink may further be improved.

The monomer that later becomes, upon polymerization, the aromatic group-containing unit preferably has in the molecule thereof one polymerizable functional group such as ethylenic unsaturated bond. The monomer is specifically exemplified by styrene, vinyltoluene, p-fluoroetyrene, p-chlorostyrene, α-methylstyrene, 2-vinylnaphthalene, 9-vinylanthracene, 9-vinylcarbazole, phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth)acrylate and (1-pyrenyl)methyl (meth)acrylate. The monomer that later becomes, upon polymerization, the aromatic group-containing unit is preferably any of those free of anionic group or cyano group, and those preferably having a molecular weight of 300 or less, which is more preferably 200 or less. Among them, styrene and derivative thereof are preferred, and styrene and vinyltoluene are particularly preferred, from the viewpoint of excellence of reactivity during polymerization and excellence of stability of the obtainable resin particle.

The monomer that later becomes, upon polymerization, the cyano group-containing unit preferably has in the molecule thereof one polymerizable functional group such as ethylenic unsaturated bond. The monomer is specifically exemplified by acrylonitrile, methacrylonitrile, chloroacrylonitrile and 2-cyanoethyl (meth)acrylate. The monomer that later becomes, upon polymerization, the cyano group-containing unit is preferably any of those free of anionic group or aromatic group, and those preferably having a molecular weight of 300 or less, which is more preferably 200 or less. Among them, acrylonitrile and methacrylonitrile are particularly preferred, from the viewpoint of excellence of reactivity during polymerization and excellence of stability of the obtainable resin particle.

The anionic group in the anionic group-containing unit preferably has in the molecule thereof one polymerizable functional group such as ethylenic unsaturated bond. The monomer is specifically exemplified by carboxylic acid group, phenolic hydroxy group and phosphoric ester group. Among them, carboxylic acid group is preferred from the viewpoint of good stability of the resin particle in the ink. The monomer that later becomes, upon polymerization, the anionic group-containing unit is exemplified by (meth)acrylic acid, p-vinylbenzoic acid, 4-vinylphenol, β-carboxyethyl (meth)acrylate, 2-hydroxyethyl methacrylate phosphohate, 2-hydroxyethyl (meth)acrylate and 3-hydroxypropyl (meth)acrylate. The monomer that later becomes, upon polymerization, the anionic group-containing unit is preferably any of those free of aromatic group or cyano group, and those preferably having a molecular weight of 300 or less, which is more preferably 200 or less. Among them, (meth)acrylic acid is particularly preferred. The anionic group in the anionic group-containing unit is preferably carboxylic acid group only. The anionic group may be present in either of an acid or salt form. In the latter case, either a portion or the whole of the salt may be dissociated. Examples of a cation which is the counter ion of the anionic group in salt form include alkali metal cations, ammonium and organic ammoniums.

The crosslinking agent that composes the crosslinking agent-derived unit may only be at least one kind, but two or more kinds of crosslinking agent are preferably used. The crosslinking agent, containing two or more kinds of crosslinking agent, preferably contains a glycidyl group-containing crosslinking agent as one of them. The glycidyl group-containing crosslinking agent reacts with and crosslinks the anionic group, such as carboxylic acid group, that resides in the shell portion. This successfully suppresses the hydrophilicity of the shell portion from excessively increasing, and further improves the sticking recoverability of the ink. Moreover, use of two or more kinds of crosslinking agent can produce a densely cross-linked structure which can more effectively suppress the hydrophilicity of the shell portion from excessively increasing.

The crosslinking agent that later becomes, upon polymerization, the crosslinking agent-derived unit is exemplified by a compound having in the molecule thereof two or more polymerizable functional groups such as ethylenic unsaturated bond. Such crosslinking agent is exemplified by diene compounds such as butadiene and isoprene; bifunctional (meth)acrylates such as 1,4-butanediol di(meth)acrylate, 1,9-nonanediol di(meth)acrylate, (mono-, di-, tri-, poly-) ethylene glycol di(meth)acrylate, (mono-, di-, tri-, poly-) propylene glycol di(meth)acrylate, (mono-, di-, tri-, poly-)

tetramethylene glycol di(meth)acrylate, ethylene oxide modified bisphenol A di(meth)acrylate, 2-hydroxy-3-(meth) acryloyloxypropyl methacrylate, propoxylated ethoxylated bisphenol A di(meth)acrylate, ethoxylated bisphenol A di(meth)acrylate, 9,9-bis(4-(2-(meth)acryloyloxyethoxy) phenyl)fluorene, tricyclodecanedimethanol di(meth)acrylate, 1,10-decanediol di(meth)acrylate, 1,6-hexanediol di(meth)acrylate, neopentyl glycol di(meth)acrylate, tricyclodecanedimethanol di(meth)acrylate, ethoxylated polypropylene glycol di(meth)acrylate and glycerin di(meth) acrylate; trifunctional (meth)acrylates such as tris(2-(meth) acryloyloxyethyl)isocyanurate, trimethylolpropane tri (meth)acrylate, tris(2-hydroxyethyl)isocyanurate tri(meth) acrylate, ethoxylated trimethylolpropane tri(meth)acrylate, pentaerythritol tri(meth)acrylate, propoxylated trimethylolpropane tri(meth)acrylate, propoxylated glyceryl tri(meth) acrylate, ethoxylated isocyanuric acid tri(meth)acrylate, 8-caprolactone modified tris(2-(meth)acryloyloxyethyl) isocyanurate and ethylene oxide modified trimethylolpropane tri(meth)acrylate; tetrafunctional (meth)acrylates such as ditrimethylolpropane tetra(meth)acrylate, ethoxylated pentaerythritol tetra(meth)acrylate and pentaerythritol tetra(meth)acrylate; and divinylbenzene.

The crosslinking agent preferably has a molecular weight of more than 200, which is more preferably more than 300, and is even more preferably 400 or more. The crosslinking agent preferably has in the molecule thereof two ethylenic unsaturated bonds. By employing the compound having in the molecule thereof two ethylenic unsaturated bonds as the crosslinking agent, the resin particle may be suppressed from causing aggregation otherwise possibly caused by excessive crosslinkage, and will have more uniform particle size. Among the compounds having in the molecules thereof two ethylenic unsaturated bonds, more preferred are divinylbenzene and ethylene glycol di(meth)acrylate.

The glycidyl group-containing crosslinking agent is exemplified by ethylene glycol diglycidyl ether, polyethylene glycol diglycidyl ether, sorbitol polyethylene glycol diglycidyl ether, glycerol polyglycidyl ether, diglycerol polyglycidyl ether, polyglycerol polyglycidyl ether, pentaerythritol polyglycidyl ether, propylene glycol diglycidyl ether, polypropylene glycol diglycidyl ether, trimethylolpropane polyglycidyl ether and neopentyl glycol diglycidyl ether. Among them, ethylene glycol diglycidyl ether is preferred, since it can form a high density cross-linked structure, and can very effectively suppress the hydrophilicity of the shell portion from excessively increasing.

The resin particle, when manufacturing, can employ a surfactant. The resin particle, manufactured in the presence of the surfactant, will advantageously have stabilized particle size and shape. The surfactant, if it were nonreactive, would tend to separate from the resin particle. The surfactant, if separated in the ink, would adversely affect physical properties of the ink, to thereby degrade ejection stability and so forth. Hence, the surfactant employed for manufacture of the resin particle is preferably a reactive surfactant.

The reactive surfactant employable here is preferably a compound having a polymerizable functional group such as (meth)acryloyl group, maleyl group, vinyl group or allyl group, bound inside or at the terminal of the molecule composed of a hydrophilic part and a hydrophobic part. The hydrophilic part is exemplified by polyoxyalkylene chain such as ethylene oxide chain and propylene oxide chain. Meanwhile, the hydrophobic part is exemplified by alkyl group, aryl group and any structure combining these groups. The hydrophilic part and the hydrophobic part may be linked via a linking group such as ether group. The reactive surfactant preferably has a molecular weight of more than 200, which is more preferably more than 300, and is even more preferably 400 or more.

The reactive surfactant is specifically exemplified by polyoxyethylene nonylpropenylphenyl ether, ammonium polyoxyethylene nonylpropenylphenyl ether sulfate, ammonium polyoxyethylene-1-(allyloxymethyl)alkyl ether sulfate, α-hydro-ω-(1-alkoxymethyl-2-(2-prop enyloxy) ethoxy)-poly(oxy-1,2-ethanediyl)), α-[1-{(allyloxy) methyl}-2-(nonylphenoxy)ethyl]-ω-hydroxypolyoxyethylene, α-sulfo-ω-(1-alkoxymethyl-2-(2-propenyloxy)ethoxy)-poly(oxy-1,2-ethanediyl) ammonium salt, sodium 2-sulfoethyl methacrylate, bis (polyoxyethylene polycyclic phenyl ether)methacrylate sulfuric ester salt, alkoxypolyethylene glycol methacrylate, alkoxypolyethylene glycol maleate, polyoxyalkylene alkenyl ether, ammonium polyoxyalkylene alkenyl ether sulfate, vinyl ether alkoxylate, alkylallylsulfosaccinic acid salt, polyoxyalkylene methacrylate sulfuric ester salt and unsaturated phosphoric acid ester. Among them, preferred is α-sulfa-ω-(1-alkoxymethyl-2-(2-propenyloxy)ethoxy)-poly(oxy-1,2-ethanediyl) ammonium salt (trade names "ADEKA REASOAP" SR-10S, SR-10, SR-20, SR-3025, SE-10N and SE-20N, from ADEKA Corporation).

The core portion and the shell portion of the resin particle may contain any unit other than those described above, without damaging the effects of the present invention. Such unit other than those described above preferably has one polymerizable functional group in the molecule, which is exemplified by a unit derived from ethylenic unsaturated monomer.

The ethylenic unsaturated monomer is exemplified by alkenes such as ethylene and propylene; alkyl (meth)acrylates such as methyl (meth)acrylate, ethyl (meth)acrylate, butyl (meth)acrylate, lauryl (meth)acrylate and hexadecyl (meth)acrylate; monocyclic (meth)acrylates such as cyclopropyl (meth)acrylate, cyclohexyl (meth)acrylate, cyclooctyl (meth)acrylate and cyclodecyl (meth)acrylate; bicyclic (meth)acrylates such as isobornyl (meth)acrylate and norbornyl (meth)acrylate; tricyclic (meth)acrylates such as adamanthyl (meth)acrylate, dicyclopentanyl (meth)acrylate and dicyclo pentenyloxyethyl (meth)acrylate; and nonionic hydrophilic group-containing (meth)acrylates such as methoxy(mono-, di-, tri-, poly-)ethylene glycol (meth)acrylate. The ethylenic unsaturated monomer is preferably any of those free of anionic group, cyano group or aromatic group, and preferably having a molecular weight of 300 or less, which is more preferably 200 or less. Among them, preferred are alkenes having 1 or more to 22 or less carbon atoms; and alkyl (meth)acrylate whose alkyl group having 1 or more to 22 or less carbon atoms. In view of easy controllability of physical properties of the resin particle, and obtainability of the resin particle that excels in polymerization stability, more preferred are alkyl (meth)acrylate whose alkyl group having 1 or more to 12 or less carbon atoms, and particularly preferred are methyl (meth)acrylate and ethyl (meth)acrylate.

As described previously, the core portion has the aromatic group-containing unit and the cyano group-containing unit. Percentage (% by mass) of the aromatic group-containing unit in the core portion is preferably 25% by mass or more to 90% by mass or less, and more preferably 35% by mass or more to 90% by mass or less. Percentage (% by mass) of the cyano group-containing unit in the core portion is preferably 10% by mass or more to 60% by mass or less, and more preferably 20% by mass or more to 55% by mass or less. With the percentage of the cyano group-containing unit in the core portion less than 10% by mass, color developability of image would slightly decrease. Meanwhile, with the percentage of cyano group-containing unit in the core portion more than 60% by mass, a part of cyano group of the core portion would be more likely to expose on the surface of the resin particle, and the sticking recoverability of the ink would slightly degrade. Percentage (% by mass) of the additional unit in the core portion is preferably 15% by mass or less. The "additional unit" in the core portion is defined as a unit other than the aromatic group-containing unit and the cyano group-containing unit. The "additional unit" in the core portion preferably has, in the structure thereof, a reactive surfactant-derived unit. The core portion is preferably not cross-linked. That is, the "additional unit" in the core portion is preferably free of the crosslinking agent-derived unit.

The shell portion contains, as described previously, the aromatic group-containing unit, the anionic group-containing unit and the crosslinking agent-derived unit, but contains substantially no cyano group-containing unit. Percentage (% by mass) of the aromatic group-containing unit in the shell portion is preferably 1% by mass or more to 60% by mass or less, and more preferably 10% by mass or more to 50% by mass or less.

Percentage (% by mass) of the anionic group-containing unit in the shell portion is preferably 5% by mass or more to 30% by mass or less, and more preferably 10% by mass or more to 20% by mass or less. With the percentage of the anionic group-containing unit in the shell portion less than 5% by mass, ejection stability of the ink would slightly decrease. Meanwhile, with the percentage of the anionic group-containing unit in the shell portion more than 30% by mass, the hydrophilicity of the shell portion would excessively increase. This would make the shell portion more likely to separate from the core portion, and makes the cyano group of the core portion more likely to expose on the surface of the resin particle, so that the sticking recoverability of the ink would slightly degrade.

Percentage (% by mass) of the crosslinking agent-derived unit in the shell portion is 30% by mass or more to 80% by mass or less, and is preferably 40% by mass or more to 70% by mass or less. With the percentage of the crosslinking agent-derived unit in the shell portion less than 30% by mass, the cyano group in the core portion will be more likely to expose in a situation that the shell portion will become excessively hydrophilic due to collaboration with the water-soluble resin, making the sticking recoverability of the ink poorer. Meanwhile, with the percentage of the crosslinking agent-derived unit in the shell portion more than 80% by mass, ejection stability of the ink will be poor.

Percentage (% by mass) of the additional unit in the shell portion is preferably 10% by mass or less, and more preferably 5% by mass or less. The "additional unit" in the shell portion is defined as a unit other than the aromatic group-containing unit, the anionic group-containing unit and the crosslinking agent-derived unit. The "additional unit" in the shell portion preferably has, in the structure thereof, a reactive surfactant-derived unit.

Ratio by mass of the core portion and the shell portion of the resin particle represented by (core portion): (shell portion), with the total being 100, is preferably 50:50 to 95:5, and more preferably 60:40 to 90:10.

The resin particle preferably has a cumulative 50% particle diameter in volume-based particle size distribution (D50) of 120 nm or less. With the p cumulative 50% particle diameter in volume-based particle size distribution (D50) more than 120 nm, the resin particle will be more likely to scatter light, and thereby the color developability of image would slightly degrade. The resin particle preferably has a cumulative 50% particle diameter in volume-based particle size distribution (D50) of 50 nm or more. The cumulative 50% particle diameter in volume-based particle size distribution (D50) of the resin particle may be measured in the same way by which whether the resin particle or not is determined as described previously.

Content (% by mass) of the resin particle in the ink is preferably 1.0% by mass or more to 10.0% by mass or less based on the total mass of ink. With the content of the resin particle less than 1.0% by mass, the color developability of image would slightly degrade. Meanwhile, with the content of the resin particle more than 10.0% by mass, the ejection stability of the ink would slightly degrade.

[Method for Manufacturing Dyed Resin Particle]

The resin particle may be manufactured by any of known methods including emulsion polymerization, mini-emulsion polymerization, seeded polymerization and phase inversion emulsification. Method of dyeing of the resin particle is exemplified a method by which a monomer mixed liquid having a fluorescent dye dissolved therein is allowed to polymerize to produce the resin particle; and a method by which the resin particle and a fluorescent dye added thereto are heated. Among them, the method of heating the resin particle with the fluorescent dye added thereto is preferred, for its applicability to a wider variety of fluorescent dyes. The heating is preferably carried out without using dyeing auxiliary (water-soluble resin, surfactant, etc.). The water-soluble resin, when used as a dyeing auxiliary, would form a film to inhibit re-dispersion of the resin particle, and thereby the sticking recoverability of the ink would slightly degrade. The surfactant, when used as a dyeing auxiliary, would adversely affect the physical properties of ink, and thereby the ejection stability of ink would slightly degrade.

[Method for Verifying Resin Particle]

Structure of the resin particle may be verified by a method having processes (i) to (iii) below. Although the description below will deal with a case where the resin particle is extracted from the ink for analysis and verification, also the resin particle extracted from aqueous dispersion and so forth may be analyzed and verified in the same way.

(i) Isolation of Resin Particle

The resin particle contained in the ink may be separated and extracted by density gradient centrifugation. Among types of the density gradient centrifugation, density gradient sedimentation velocity method can separate and extract the resin particle, on the basis of difference of sedimentation coefficients among the ingredients. Meanwhile, among types of the density gradient centrifugation, density gradient sedimentation equilibrium method can separate and extract the resin particle, on the basis of difference of density among the ingredients.

(ii) Confirmation and Separation of Layer Structure

The resin particle is dyed and fixed with ruthenium tetroxide, and then embedded in an epoxy resin for stable immobilization. The resin particle embedded in the epoxy resin is then sliced using a ultramicrotome, and the cross-sectional face is observed under a scanning transmission electron microscope (STEM). The layer structure of the resin particle can be confirmed by observing a cross-sectional face that falls on the center of gravity of the resin particle. Also elements contained in the layers constituting the resin particles (core portion and shell portion) may be determined by quantitatively analyzing the sample resin particle embedded in the epoxy resin, using a STEM-EDX having an energy distributed X-ray spectrometer combined therein.

(iii) Analysis of Unit (Monomer) Constituting Resin in Individual Layers

The sample resin particle, from which the resins in the individual layers are separated, may exist in the form of dispersion liquid. The sample may alternatively be a film obtained by drying the resin particle. The sample resin particle is dissolved in an organic solvent, then separated into the individual layers by gel permeation chromatography (GPC), and resin components constituting the individual layers are fractionated. The thus fractionated resin components are subjected to element analysis. Apart from this, the thus fractionated resin was pretreated by acid digestion (with addition of hydrofluoric acid) or alkali fusion, and subjected to quantitative analysis of inorganic components based on induction-coupled plasma emission spectrometry. The layer of the resin particle having been formed by the fractionated resin component may be determined by comparing results of the element analysis and the quantitative analysis of inorganic components, with results of the element analysis using STEM-EDX obtained in (ii) above.

The fractionated resin is also analyzed by nuclear magnetic resonance (NMR) and matrix-assisted laser desorption/ionization mass spectrometry (MALDI-MS). These analyses give information on types and ratios of the unit (monomer) and crosslinking component constituting the resin. The monomer produced as a result of depolymerization is also detectable directly by analyzing the resin fractionated by pyrolytic chromatography.

(Water-Soluble Resin)

The water-soluble resin has the aromatic group-containing unit and the anionic group-containing unit. The water-soluble resin is preferably acrylic resin or urethane resin, and more preferably acrylic resin. In the presence of the water-soluble resin having the aromatic group-containing unit, the aromatic group of the water-soluble resin can cause hydrophobic interaction and π-π interaction with the aromatic group of the resin particle. As a consequence, the water-soluble resin adsorbs to the resin particle and assists dispersion of the resin particle, thereby improving the ejection stability of the ink.

In the ink after stored for a long period, a part of the fluorescent dye having been adhered to the resin particle, migrates towards the water-soluble resin, with the aid of various types of interaction with the water-soluble resin (electrostatic interaction, hydrophobic interaction, dipolar interaction). In the process of such event, the amount of dye adhered to the resin particle will decrease, while keeping the content of the dye in the ink constant. This moderates the concentration quenching that possibly occurs among dye molecules within the resin particles, and improves the color developability of image.

Migration of the dye towards the water-soluble resin may easily confirmed by the density gradient centrifugation described previously. An ink free of the water-soluble resin will show only a single band assignable to the resin particle as a dyed ingredient. In contrast, an ink containing the water-soluble resin will show two bands, which are a band assignable to the resin particle and a band assignable to the dyed resin particle.

The aromatic group-containing unit and the anionic group-containing unit, employable for the water-soluble acrylic resin, may be the aforementioned aromatic group-containing unit and the anionic group-containing unit. The water-soluble acrylic resin may further contain a unit (additional unit) other than the aromatic group-containing unit and the anionic group-containing unit. Monomer that constitutes the additional unit, including those having substituents such as alkoxy group or hydroxy group, is exemplified by 2-hydroxyethyl (meth)acrylate; 3-hydroxypropyl (meth)acrylate; methoxy (mono-, di-, tri-, poly-)ethylene glycol (meth)acrylates; alkenes such as ethylene and propylene; alkyl (meth)acrylates such as methyl (meth)acrylate, ethyl (meth)acrylate, butyl (meth)acrylate, lauryl (meth)acrylate and hexadecyl (meth)acrylate; monocyclic (meth)acrylates such as cyclopropyl (meth)acrylate, cyclohexyl (meth)acrylate, cyclooctyl (meth)acrylate and cyclodecyl (meth)acrylate; bicyclic (meth)acrylates such as isobornyl (meth)acrylate and norbornyl (meth)acrylate; and tricyclic (meth)acrylates such as adamanthyl (meth)acrylate, dicyclopentanyl (meth)acrylate and dicyclopentenyloxyethyl (meth)acrylate. The water-soluble acrylic resin may be any of random copolymer, block copolymer or graft copolymer.

The water-soluble urethane resin employable here may be obtained by reaction between a polyisocyanate, and a component capable of reacting therewith (polyol having acid group, polyol free of acid group, polyamine, etc.). This may be a product obtained by further reaction with a chain extender or crosslinking agent. At least one of these components employable here has an aromatic group.

The water-soluble resin has an acid value of 100 mgKOH/g or more to 180 mgKOH/g or less. With the acid value of the water-soluble resin less than 100 mgKOH/g, the ejection stability of the ink will become poor. Meanwhile, with the acid value of the water-soluble resin more than 180 mgKOH/g, the anionic group in the shell portion of the resin particle will be neutralized by an ion derived from the anionic group of the water-soluble resin, making the shell portion more likely to dissolve in water, and making the coverage over the core portion loosened. This makes the cyano group-containing core portion more likely to expose, and degrades the sticking recoverability of the ink.

The water-soluble resin preferably has a weight-average molecular weight of 5,000 or more to 20,000 or less. With the weight-average molecular weight of the water-soluble resin less than 5,000, an effect of improving the ejection stability of the ink would slightly degrade. Meanwhile, with the weight-average molecular weight of the water-soluble resin more than 20,000, the ink would tend to have increased viscosity, and an effect of improving the ejection stability of the ink would slightly degrade.

Content (% by mass) of the water-soluble resin in the ink is preferably 0.1% by mass or more to 5.0% by mass or less based on the total mass of ink. Content (% by mass) of the water-soluble resin, when expressed in mass ratio relative to content (% by mass) of the resin particle, is preferably 0.1 times or larger and 2.0 times or less. With the mass ratio less than 0.1 times, an effect of improving the ejection stability of the ink would slightly degrade. Meanwhile, with the mass ratio more than 2.0 times, the anionic group in the shell portion of the resin particle will be neutralized by an ion derived from the anionic group of the water-soluble resin, making the cyano group-containing core portion more likely to expose. This would slightly degrade an effect of improving the sticking recoverability of the ink.

Physical properties of the water-soluble resin, such as chemical composition, weight-average molecular weight and acid value, may be measured according to any of known methods. More specifically, the physical properties of the water-soluble resin may be measured by analyzing precipitate and supernatant obtainable after centrifugation of the ink. The water-soluble resin, although analyzable while being dissolved in the ink, is more preferably analyzed after extracted from the ink for improved accuracy of measurement. More specifically, the ink is preferably centrifuged at 75,000 rpm to obtain the supernatant, to which an excessive amount of acid (hydrochloric acid, etc.) is added, and the precipitated resin is dried and analyzed.

Types of the units that constitute the water-soluble resin may be confirmed by analyzing the resin, after separated from the ink, using a pyrolysis gas chromatograph/mass spectrometer (Pyro-GC/MS). In addition, molecular weights and types of monomers that constitute the individual units may be quantitatively confirmed by nuclear magnetic resonance ($^{13}$C-NMR) or Fourier transform infrared spectrophotometry (FT-IR).

The acid value of the water-soluble resin may be measured by titration. More specifically, the water-soluble resin is dissolved in tetrahydrofuran (THF) to prepare a sample for measurement. The acid value of the water-soluble resin may be measured by subjecting the thus prepared sample for measurement to potentiometric titration, using an automatic potentiometric titrator and potassium hydroxide titration solution in ethanol. The automatic potentiometric titrator employable here is typically Trade name "AT510" from Kyoto Electronics Manufacturing Co., Ltd.

The weight average molecular weight of the water-soluble resin may be measured by gel permeation chromatography (GPC). Measurement conditions for GPC are as follows:

Apparatus: Alliance GPC 2695 (from Waters Corporation)

Column: four serial Shodex KF-806M columns (from Showa Denko K.K.)

Mobile phase: THF (special grade)

Flow rate: 1.0 mL/min

Oven temperature: 40.0° C.

Injection volume of sample solution: 0.1 mL

Detector: RI (refractive index)

Polystyrene standard samples: PS-1 and PS-2 (from Polymer Laboratories Ltd., 17 variations with molecular weights of 7,500,000, 2,560,000, 841,700, 377,400, 320,000, 210,500, 148,000, 96,000, 59,500, 50,400, 28,500, 20,650, 10,850, 5,460, 2,930, 1,300 and 580).

(Aqueous Medium)

The ink is an aqueous ink containing at least water as the aqueous medium. The ink may further contain a water-soluble organic solvent as the aqueous medium. The water is preferably deionized water or ion-exchanged water. Content (% by mass) of water in the ink is preferably 50.0% by mass or more to 95.0% by mass or less based on the total mass of ink. The water-soluble organic solvent may be any of those commonly used for the ink. Examples include alcohols, (poly)alkylene glycols, glycol ethers, nitrogen-containing compounds and sulfur-containing compounds. Content (% by mass) of the water-soluble organic solvent in the ink is preferably 3.0% by mass or more to 50.0% by mass or less based on the total mass of ink.

(Lightproof Agent)

The resin particle preferably has a lightproof agent included therein. The resin particle includes the lightproof agent is such a way that the resin constituting the resin particle entangles to form a three-dimensional structure, in which the lightproof agent is included. The fluorescent dye is decomposed by light supposedly because a radical or peroxide, generated from the fluorescent dye upon irradiation with light (UV), reacts again with the fluorescent dye. Hence, the lightproof agent may be a compound capable of suppressing the ingredient from degrading by light, through absorbing UV, or scavenging the radical or peroxide. The lightproof agent employable here is at least one antioxidant, light stabilizer and UV absorber.

The antioxidant suppresses the fluorescent dye from degrading by decomposing the peroxide. The antioxidant is specifically exemplified by sulfides, hindered phenols and phosphites. The light stabilizer suppresses the fluorescent dye from degrading by scavenging the radical. The light stabilizer is specifically exemplified by hindered amines. The UV absorber suppresses the fluorescent dye from degrading by absorbing UV to convert it into heat energy, and thereby suppressing the radical or peroxide from generating. The UV absorber is specifically exemplified by benzotriazoles and triazines. Since the fluorescent dye may effectively be suppressed from degrading through decomposition of the peroxide, so that the antioxidant is preferably used, and sulfides are particularly preferred. Meanwhile, the UV absorber would absorb a part of ultraviolet light emitted from the fluorescent dye, and would therefore slightly degrade the color developability of the fluorescent dye as compared with other lightproof agents.

Content (% by mass) of the lightproof agent in the ink is preferably 0.1% by mass or more to 5.0% by mass or less based on the total mass of ink. Percentage (% by mass) of the lightproof agent in the resin particle is preferably 0.1% by mass or more to 10.0% by mass or less. Too small percentage of the lightproof agent in the resin particle would slightly degrade the effect of improving the light resistance of images. Meanwhile, too large percentage of the lightproof agent in the resin particle would slightly degrade the ejection property.

Whether the resin particle includes the lightproof agent or not may be determined, for example, by the method described below. Although the description below will deal with a case where the resin particle is extracted from the ink for analysis, also the resin particle extracted from aqueous dispersion and so forth may be analyzed in the same way. First, the resin particle is separated from the ink by density gradient centrifugation. The density gradient sedimentation velocity method can separate and extract the resin particle, on the basis of difference of sedimentation coefficients among the ingredients. Meanwhile, the density gradient sedimentation equilibrium method can separate and extract the resin particle, on the basis of difference of density among the ingredients. The obtained dispersion of the resin particle is dried, and then dissolved in an organic solvent which can solubilize both of the lightproof agent and the resin, to thereby prepare a sample solution. The lightproof agent and the resin particle are separated by gel permeation chromatography (GPC), high performance liquid chromatography (HPLC), column chromatography or the like. The separated lightproof agent and the resin particle are individually analyzed by nuclear magnetic resonance (NMR) spectroscopy, matrix-assisted laser desorption/ionization mass spectrometry (MALDI-MS) or the like. This gives information on types and ratios of the lightproof agent, and types and ratios of the unit (monomer) constituting the resin.

(Other Additives)

Besides the ingredients described previously, the ink may optionally contain a water-soluble organic compound that exists as solid at normal temperature, which is exemplified by polyhydric alcohols such as trimethylolpropane and trimethylolethane; and urea derivatives such as urea and ethylene urea. The ink may further contain various optional additives such as surfactant, pH adjuster, antirust agent, antiseptic agent, anti-mold agent, antioxidant, anti-reduction agent, evaporation promoter, chelating agent and other resin.

Although the ink may contain a coloring material such as pigment or dye (non-fluorescent dye, and fluorescence-emitting dyes other than basic dye, disperse dye and oil-soluble dyes), it is usually unnecessary to add the coloring material.

(Physical Properties of Ink)

The ink, being an aqueous ink applicable to the ink jet system, preferably has physical properties that are suitably controlled. More specifically, the ink preferably has a surface tension at 25° C., when measured by the plate method, of 20 mN/m or more to 60 mN/m or less, which is more preferably 25 mN/m or more to 45 mN/m or less. Viscosity of the ink at 25° C. is preferably 1.0 mPa·s or more to 10.0 mPa·s or less, and more preferably 1.0 mPa·s or more to 5.0 mPa·s or less. pH of the ink at 25° C. is preferably 7.0 or more to 10.0 or less.

<Ink Cartridge>

The ink cartridge of the present invention has an ink, and an ink storage portion that stores the ink. The ink stored in this ink storage portion is the aqueous ink of the present invention described above. FIG. 1 is a cross sectional view schematically illustrating an embodiment of the ink cartridge of the present invention. As illustrated in FIG. 1, the ink cartridge has, on the bottom face thereof, an ink supply port 12 through which the ink is supplied to the recording head. The ink cartridge has in the inside thereof the ink storage portion for storing the ink. The ink storage portion is composed of an ink storage chamber 14 and an absorber storage chamber 16 which communicate with each other through a communication hole 18. The absorber storage chamber 16 also communicates with the ink supply port 12. The ink storage chamber 14 stores a fluidic ink 20, and the absorber storage chamber 16 stores absorbers 22 and 24 that retain the ink in an impregnated manner. The ink storage portion may alternatively have no ink storage chamber for storing the fluidic ink, and instead may retain the whole ink to be stored with the absorber. Alternatively, the ink storage portion may have no absorber, and instead may store the whole ink in a fluidic state. Again alternatively, the ink cartridge may be composed of the ink storage portion and the recording head.

<Ink Jet Recording Method>

The ink jet recording method of the present invention is a method by which an image is recorded on a recording medium with the aforementioned aqueous ink of the present invention, ejected from the recording head of an ink jet system. System for ejecting ink is exemplified by a system of applying mechanical energy to the ink, and a system of applying heat energy to the ink. In the present invention, the system of applying heat energy to the ink before ejection is particularly preferred. Processes in the ink jet recording method may be any of known ones, except that the ink of the present invention is used.

Figure 2A:
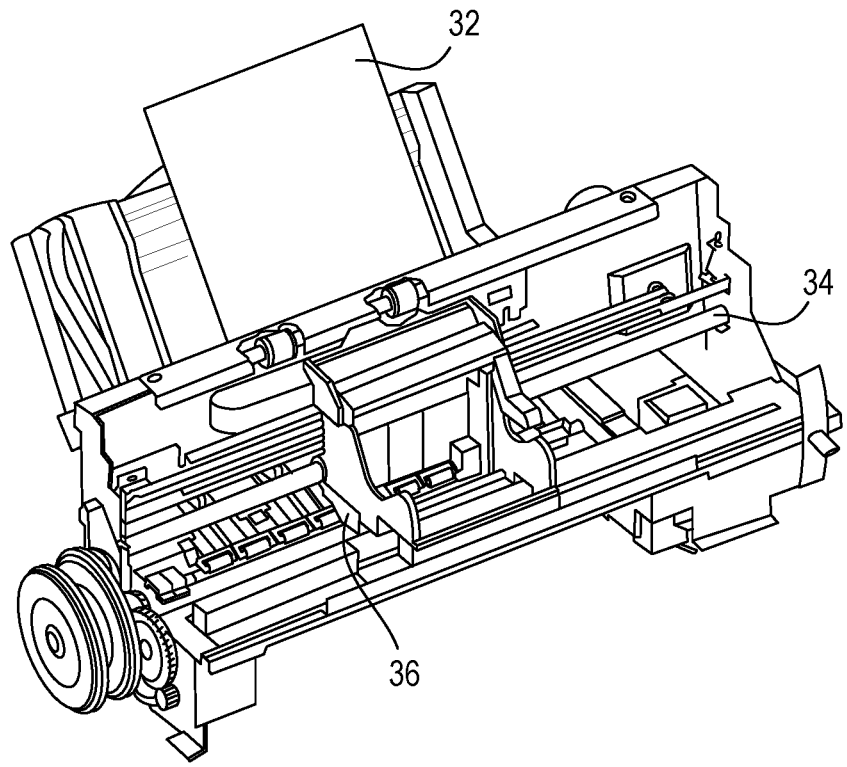
FIG. 2A is a perspective view illustrating an essential part of an ink jet recording apparatus used for the ink jet recording method of the present invention.
Figure 2B:
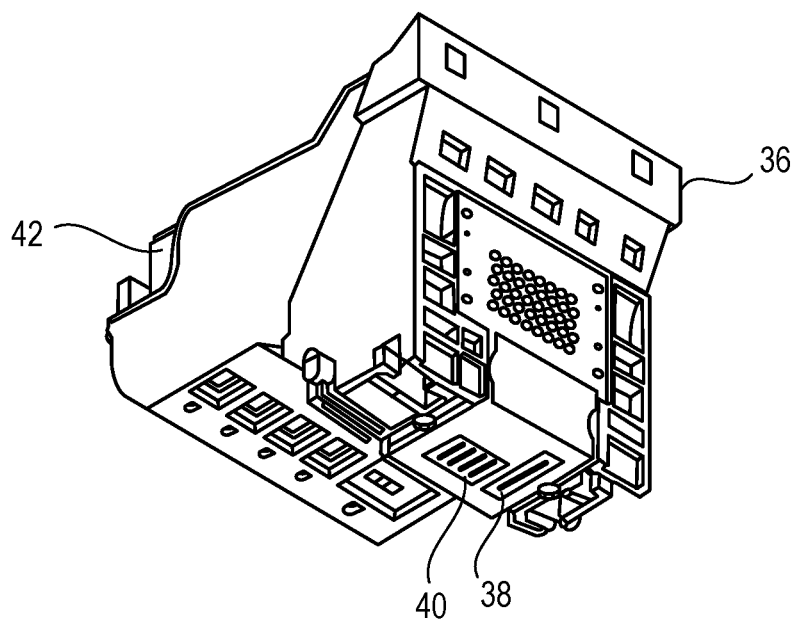
FIG. 2B is a perspective view illustrating a head cartridge of an ink jet recording apparatus, used for the ink jet recording method of the present invention.

FIGS. 2A and 2B are drawings schematically illustrating an exemplary ink jet recording apparatus used for the ink jet recording method of the present invention, wherein FIG. 2A is a perspective view illustrating a major part of the recording apparatus, and FIG. 2B is a perspective view illustrating a head cartridge. The ink jet recording apparatus has a conveying unit (not illustrated) that conveys a recording medium 32, and a carriage shaft 34. The carriage shaft 34 is designed to have a head cartridge 36 mounted thereon. The head cartridge 36 has recording heads 38 and 40, and is designed to have an ink cartridge 42 set thereon. In the duration over which the head cartridge 36 is conveyed in the main scanning direction along the carriage shaft 34, the ink (not illustrated) is ejected from the recording heads 38 and 40 towards the recording medium 32. Then as a result of conveyance of the recording medium 32 by the conveying unit (not illustrated) in the sub-scanning direction, an image is recorded on the recording medium 32. The recording medium 32, although not specifically limited, is preferably paper-based recording medium, such as a recording medium free of coating layer, such as plain paper; or a recording medium having coating layer, such as glossy paper and matte paper. The recording medium is not necessarily for transfer use.

EXAMPLES

The present invention will further be detailed below, referring to Examples and Comparative Examples. The present invention is, however, by no means limited to these Examples, without departing from the spirit thereof. All amounts of ingredients given in "part(s)" or "%" are on the mass basis unless otherwise specifically noted.

<Preparation of Water Dispersion of Resin Particle>

A reaction vessel equipped with a stirrer was set on a warm water bath. In the reaction vessel, poured was 1,178 parts of water, and the inner temperature was kept at 70° C. A monomer later becoming the aromatic group-containing unit, a monomer later becoming the cyano group-containing unit (also including a monomer for a control example), and a reactive surfactant later becoming the reactive surfactant unit were mixed according to the amount of charge (parts) and proportion (%) summarized in Table 1-1. A mixed monomer solution for forming the core portion was thus prepared. The reactive surfactant employed here was "ADEKA REASOAP SR-10" (trade name, from ADEKA Corporation). On the other hand, 1.9 parts of potassium persulfate and 659 parts of water were mixed to prepare an aqueous polymerization initiator solution 1. The mixed monomer solution for forming the core portion and the aqueous polymerization initiator solution 1 were added dropwise in parallel into the reaction vessel over 60 minutes. After completion of the dropwise addition, the content was kept stirred for additional 30 minutes, to thereby synthesize a particle later becoming the core portion of the resin particle. Note that the core portion was not synthesized for a resin particle 47.

Next, a monomer later becoming the aromatic group-containing unit (also including a monomer for the control example), a monomer later becoming the anionic group-containing unit, a crosslinking agent later becoming the crosslinking agent-derived unit, and a reactive surfactant later becoming the reactive surfactant unit were prepared. The thus prepared monomers were mixed according to the amount of charge (parts) and proportion (%) summarized in Table 1-1, to thereby prepare a mixed monomer solution for forming the shell portion. The reactive surfactant employed here was "ADEKA REASOAP SR-10" (trade name, from ADEKA Corporation). On the other hand, 0.1 parts of potassium persulfate and 133 parts of water were mixed to prepare an aqueous polymerization initiator solution 2. Into the reaction vessel containing the particle later becoming the core portion, added dropwise were the mixed monomer solution for forming the shell portion and the aqueous polymerization initiator solution 2, in parallel over 10 minutes. After completion of the dropwise addition, the content was kept stirred at 80° C. for 10 minutes so as to synthesize the shell portion, to thereby synthesize a resin particle having a core-shell structure in which the particle constituting the core portion is covered with the resin constituting the shell portion. Note that the shell portion was not synthesized for a resin particle 46.

A proper amount of an aqueous 8 mol/L potassium hydroxide solution was then added in the reaction vessel, and the liquid was adjusted to pH 8.5. Powder of the fluorescent dye was added according to the amount of charge (parts) and proportion (%) summarized in Table 1-1, and the content was heated to 80° C. The lightproof agent was added with the fluorescent dye according to the amount of charge (parts) and proportion (%) summarized in Table 1-2 for resin particles 38 to 44. The content was then stirred for 2 hours, to thereby adhere the fluorescent dye to the resin particle. The surfactant as the dying auxiliary was not used for the resin particles other than a resin particle 45. Meanwhile for the resin particle 45, an anionic surfactant (sodium lauryl sulfate) was used as the dying auxiliary. A proper amount of an aqueous 8 mol/L potassium hydroxide solution was then added in the reaction vessel, and the liquid was adjusted to pH 8.5. A proper amount of water was further added, to thereby obtain an aqueous dispersion of each resin particle with a resin particle content of 20%. Table 1-2 summarizes the particle size (cumulative 50% particle diameter in volume-based particle size distribution) of the thus obtained resin particles. The particle size of the resin particle was measured using a particle size distribution analyzer (Trade name "UPA-EX150" from Nikkiso Co., Ltd.) based on dynamic light scattering, under conditions including Set-Zero time: 30 seconds, number of runs: 3, measurement time: 180 seconds, shape: sphere and refractive index: 1.59. Note that the dye was not adhered to a resin particle 58. Among the fluorescent dyes, 'C.I. Acid Red 52' and 'C.I. Acid Yellow 73' did not belong to any one of basic dye, disperse dye and oil-soluble dye.

Abbreviations in Tables 1-1 and 1-2 are as follows.
St: styrene
Vt: vinyltoluene
AN: acrylonitrile
MAN: methacrylonitrile
EMA: ethyl methacrylate
MAA: methacrylic acid
AA: acrylic acid
EDMA: ethylene glycol dimethacrylate
DVB: divinylbenzene
EX-810: ethylene glycol diglycidyl ether (trade name "Denacol EX-810", from Nagase ChemteX Corporation)
EX-830: polyethylene glycol diglycidyl ether (trade name "Denacol EX-830", from Nagase ChemteX Corporation)
EX-521: polyglycerol polyglycidyl ether (trade name "Denacol EX-521", from Nagase ChemteX Corporation)
BR1: C.I. Basic Red 1
BR1:1: C.I. Basic Red 1:1
BV11: C.I. Basic Violet 11
BV11:1: C.I. Basic Violet 11:1
BY40: C.I. Basic Yellow 40
FB363: Fluorescent Brightener 363
AR52: C.I. Acid Red 52
DY82: C.I. Disperse Yellow 82
SY196: C.I. Solvent Yellow 196
SY160:1: C.I. Solvent Yellow 160:1
SR43: C.I. Solvent Red 43
SR45: C.I. Solvent Red 45
SO5: C.I. Solvent Orange 5
SO45: C.I. Solvent Orange 45
AY73: C.I. Acid Yellow 73
Lightproof agent 1: lightproof agent with sulfide structure (trade name "IRGANOX 1520L", from BASF SE)
Lightproof agent 2: lightproof agent with sulfide structure (trade name "ADEKA STAB AO412S", from ADEKA Corporation)
Lightproof agent 3: lightproof agent with hindered phenol structure (trade name "ADEKA STAB AO-40", from ADEKA Corporation)
Lightproof agent 4: lightproof agent with phosphite structure (trade name "ADEKA STAB TPP", from ADEKA Corporation)
Lightproof agent 5: lightproof agent with hindered amine structure (trade name "ADEKA STAB LA-81", from ADEKA Corporation)
Lightproof agent 6: lightproof agent with benzotriazole structure (trade name "ADEKA STAB LA-29", from ADEKA Corporation)
Lightproof agent 7: lightproof agent with triazine structure (trade name "ADEKA STAB LA-46", from ADEKA Corporation)

TABLE 1-1

Preparation Condition and Property of Resin Particle

| | | Core portion | | | | | Shell portion | |
| --- | --- | --- | --- | --- | --- | --- | --- | --- |
| | | Proportion of charged monomers (%) | | | | | | |
| Resin particle | Amount of charge (part) | Aromatic group-containing unit | | Cyano group-containing unit | | Reactive surfactant unit | Amount of charge (part) | Proportion of charged monomers (%) Aromatic group-containing unit, etc. |
| | | St | Vt | AN | MAN EMA | | | St |
| 1 | 466 | 47 | | 50 | | 3 | 80 | 19 |
| 2 | 466 | 47 | | | 50 | 3 | 80 | 19 |
| 3 | 466 | 47 | | 50 | | 3 | 80 | 19 |
| 4 | 466 | 47 | | 50 | | 3 | 80 | 19 |
| 5 | 466 | 47 | | 50 | | 3 | 80 | 19 |
| 6 | 466 | 47 | | 50 | | 3 | 80 | 19 |
| 7 | 466 | 47 | | 50 | | 3 | 80 | 54 |
| 8 | 466 | 47 | | 50 | | 3 | 80 | 4 |
| 9 | 466 | 47 | | 50 | | 3 | 80 | 19 |
| 10 | 466 | 47 | | 50 | | 3 | 80 | 19 |
| 11 | 466 | 47 | | 50 | | 3 | 80 | 19 |
| 12 | 466 | 47 | | 50 | | 3 | 80 | 19 |
| 13 | 466 | 89 | | 8 | | 3 | 80 | 19 |
| 14 | 466 | 87 | | 10 | | 3 | 80 | 19 |
| 15 | 466 | 37 | | 60 | | 3 | 80 | 19 |

TABLE 1-1-continued

Preparation Condition and Property of Resin Particle

| | | | | | | | | |
|---|---|---|---|---|---|---|---|---|
| 16 | 466 | 35 | | 62 | | 3 | 80 | 19 |
| 17 | 466 | 47 | | 50 | | 3 | 80 | 30 |
| 18 | 466 | 47 | | 50 | | 3 | 80 | 29 |
| 19 | 466 | 47 | | 50 | | 3 | 80 | 4 |
| 20 | 466 | 47 | | 50 | | 3 | 80 | 2 |
| 21 | 466 | | 47 | 50 | | 3 | 80 | 19 |
| 22 | 466 | 47 | | 50 | | 3 | 80 | |
| 23 | 466 | 47 | | 50 | | 3 | 80 | 44 |
| 24 | 466 | 47 | | 50 | | 3 | 80 | 44 |
| 25 | 466 | 47 | | 50 | | 3 | 80 | 19 |
| 26 | 466 | 47 | | 50 | | 3 | 80 | 19 |
| 27 | 466 | 47 | | 50 | | 3 | 80 | 19 |
| 28 | 466 | 47 | | 50 | | 3 | 80 | 19 |
| 29 | 466 | 47 | | 50 | | 3 | 80 | 19 |
| 30 | 466 | 47 | | 50 | | 3 | 80 | 19 |
| 31 | 466 | 47 | | 50 | | 3 | 80 | 19 |
| 32 | 466 | 47 | | 50 | | 3 | 80 | 19 |
| 33 | 466 | 47 | | 50 | | 3 | 80 | 19 |
| 34 | 466 | 47 | | 50 | | 3 | 80 | 19 |
| 35 | 466 | 47 | | 50 | | 3 | 80 | 19 |
| 36 | 466 | 47 | | 50 | | 3 | 80 | 19 |
| 37 | 466 | 47 | | 50 | | 3 | 80 | 19 |
| 38 | 466 | 47 | | 50 | | 3 | 80 | 19 |
| 39 | 466 | 47 | | 50 | | 3 | 80 | 19 |
| 40 | 466 | 47 | | 50 | | 3 | 80 | 19 |
| 41 | 466 | 47 | | 50 | | 3 | 80 | 19 |
| 42 | 466 | 47 | | 50 | | 3 | 80 | 19 |
| 43 | 466 | 47 | | 50 | | 3 | 80 | 19 |
| 44 | 466 | 47 | | 50 | | 3 | 80 | 19 |
| 45 | 466 | 47 | | 50 | | 3 | 80 | 19 |
| 46 | 546 | 47 | | 50 | | 3 | | |
| 47 | | | | | | | 546 | 19 |
| 48 | 466 | | | 50 | 47 | 3 | 80 | 19 |
| 49 | 466 | 47 | | | 50 | 3 | 80 | 19 |
| 50 | 466 | 47 | | 50 | | 3 | 80 | |
| 51 | 466 | 47 | | 50 | | 3 | 80 | 34 |
| 52 | 466 | 47 | | 50 | | 3 | 80 | 84 |
| 53 | 466 | 47 | | 50 | | 3 | 80 | 17 |
| 54 | 466 | 47 | | 50 | | 3 | 80 | 59 |
| 55 | 466 | 47 | | 50 | | 3 | 80 | 2 |
| 56 | 466 | 47 | | 50 | | 3 | 80 | 19 |
| 57 | 466 | 47 | | 50 | | 3 | 80 | 19 |
| 58 | 495 | 47 | | 50 | | 3 | 80 | 19 |

| | Shell portion | | | | | | | | | | Percentage of crosslinking agent-derived unit |
|---|---|---|---|---|---|---|---|---|---|---|---|
| | Proportion of charged monomers (%) | | | | | | | | | | |
| | Aromatic group-containing unit, etc. | | | Anionic group-containing unit | | Crosslinking agent-derived unit | | | | | Reactive |
| Resin particle | Vt | EMA | AN | MAA | AA | EDMA | DVB | EX-810 | EX-830 | EX-521 | surfactant unit | |
| 1 | | | | 15 | | 40 | | 25 | | | 1 | 65 |
| 2 | | | | 15 | | 40 | | 25 | | | 1 | 65 |
| 3 | | | | | 15 | 40 | | 25 | | | 1 | 65 |
| 4 | | | | 15 | | | 40 | 25 | | | 1 | 65 |
| 5 | | | | 15 | | 40 | | | 25 | | 1 | 65 |
| 6 | | | | 15 | | 40 | | | | 25 | 1 | 65 |
| 7 | | | | 15 | | 20 | | 10 | | | 1 | 30 |
| 8 | | | | 15 | | 50 | | 30 | | | 1 | 80 |
| 9 | | | | 15 | | 40 | | 25 | | | 1 | 65 |
| 10 | | | | 15 | | 40 | | 25 | | | 1 | 65 |
| 11 | | | | 15 | | 40 | | 25 | | | 1 | 65 |
| 12 | | | | 15 | | 40 | | 25 | | | 1 | 65 |
| 13 | | | | 15 | | 40 | | 25 | | | 1 | 65 |
| 14 | | | | 15 | | 40 | | 25 | | | 1 | 65 |
| 15 | | | | 15 | | 40 | | 25 | | | 1 | 65 |
| 16 | | | | 15 | | 40 | | 25 | | | 1 | 65 |
| 17 | | | | 4 | | 40 | | 25 | | | 1 | 65 |
| 18 | | | | 5 | | 40 | | 25 | | | 1 | 65 |
| 19 | | | | 30 | | 40 | | 25 | | | 1 | 65 |
| 20 | | | | 32 | | 40 | | 25 | | | 1 | 65 |
| 21 | | | | 15 | | 40 | | 25 | | | 1 | 65 |
| 22 | 19 | | | 15 | | 40 | | 25 | | | 1 | 65 |
| 23 | | | | 15 | | 40 | | | | | 1 | 40 |
| 24 | | | | 15 | | | 40 | | | | 1 | 40 |

TABLE 1-1-continued

Preparation Condition and Property of Resin Particle

| | | | | | | |
|---|---|---|---|---|---|---|
| 25 | | | 15 | 40 | 25 | 1 | 65 |
| 26 | | | 15 | 40 | 25 | 1 | 65 |
| 27 | | | 15 | 40 | 25 | 1 | 65 |
| 28 | | | 15 | 40 | 25 | 1 | 65 |
| 29 | | | 15 | 40 | 25 | 1 | 65 |
| 30 | | | 15 | 40 | 25 | 1 | 65 |
| 31 | | | 15 | 40 | 25 | 1 | 65 |
| 32 | | | 15 | 40 | 25 | 1 | 65 |
| 33 | | | 15 | 40 | 25 | 1 | 65 |
| 34 | | | 15 | 40 | 25 | 1 | 65 |
| 35 | | | 15 | 40 | 25 | 1 | 65 |
| 36 | | | 15 | 40 | 25 | 1 | 65 |
| 37 | | | 15 | 40 | 25 | 1 | 65 |
| 38 | | | 15 | 40 | 25 | 1 | 65 |
| 39 | | | 15 | 40 | 25 | 1 | 65 |
| 40 | | | 15 | 40 | 25 | 1 | 65 |
| 41 | | | 15 | 40 | 25 | 1 | 65 |
| 42 | | | 15 | 40 | 25 | 1 | 65 |
| 43 | | | 15 | 40 | 25 | 1 | 65 |
| 44 | | | 15 | 40 | 25 | 1 | 65 |
| 45 | | | 15 | 40 | 25 | 1 | 65 |
| 46 | | | | | | | 0 |
| 47 | | | 15 | 40 | 25 | 1 | 65 |
| 48 | | | 15 | 40 | 25 | 1 | 65 |
| 49 | | | 15 | 40 | 25 | 1 | 65 |
| 50 | 19 | | 15 | 40 | 25 | 1 | 65 |
| 51 | | | | 40 | 25 | 1 | 65 |
| 52 | | | 15 | | | 1 | 0 |
| 53 | | 2 | 15 | 40 | 25 | 1 | 65 |
| 54 | | | 15 | 15 | 10 | 1 | 25 |
| 55 | | | 15 | 52 | 30 | 1 | 82 |
| 56 | | | 15 | 40 | 25 | 1 | 65 |
| 57 | | | 15 | 40 | 25 | 1 | 65 |
| 58 | | | 15 | 40 | 25 | 1 | 65 |

TABLE 1-2

Preparation Condition and Property of Resin Particle

| | | Fluorescent dye | | | | | | | | | | | | | |
|---|---|---|---|---|---|---|---|---|---|---|---|---|---|---|---|
| | Amount | Proportion of amount of charge (%) | | | | | | | | | | | | | |
| Resin particle | of charge (part) | BR 1 | BV 11 | BR 1:1 | BV 11:1 | BY 40 | FB 363 | DY 82 | SY 160:1 | SY 196 | SR 43 | SR 45 | SO 5 | SO 45 | AR 52 |
| 1 | 29 | 80 | 20 | | | | | | | | | | | | |
| 2 | 29 | 80 | 20 | | | | | | | | | | | | |
| 3 | 29 | 80 | 20 | | | | | | | | | | | | |
| 4 | 29 | 80 | 20 | | | | | | | | | | | | |
| 5 | 29 | 80 | 20 | | | | | | | | | | | | |
| 6 | 29 | 80 | 20 | | | | | | | | | | | | |
| 7 | 29 | 80 | 20 | | | | | | | | | | | | |
| 8 | 29 | 80 | 20 | | | | | | | | | | | | |
| 9 | 29 | | | 80 | 20 | | | | | | | | | | |
| 10 | 29 | | | | | | | 80 | 20 | | | | | | |
| 11 | 29 | | | | | | | | | | 80 | 20 | | | |
| 12 | 29 | | | | | | | | | | | | 80 | 20 | |
| 13 | 29 | 80 | 20 | | | | | | | | | | | | |
| 14 | 29 | 80 | 20 | | | | | | | | | | | | |
| 15 | 29 | 80 | 20 | | | | | | | | | | | | |
| 16 | 29 | 80 | 20 | | | | | | | | | | | | |
| 17 | 29 | 80 | 20 | | | | | | | | | | | | |
| 18 | 29 | 80 | 20 | | | | | | | | | | | | |
| 19 | 29 | 80 | 20 | | | | | | | | | | | | |
| 20 | 29 | 80 | 20 | | | | | | | | | | | | |
| 21 | 29 | 80 | 20 | | | | | | | | | | | | |
| 22 | 29 | 80 | 20 | | | | | | | | | | | | |
| 23 | 29 | 80 | 20 | | | | | | | | | | | | |
| 24 | 29 | 80 | 20 | | | | | | | | | | | | |
| 25 | 17 | 80 | 20 | | | | | | | | | | | | |
| 26 | 23 | 80 | 20 | | | | | | | | | | | | |
| 27 | 47 | 80 | 20 | | | | | | | | | | | | |
| 28 | 61 | 80 | 20 | | | | | | | | | | | | |
| 29 | 29 | 100 | | | | | | | | | | | | | |

TABLE 1-2-continued

Preparation Condition and Property of Resin Particle

| Resin particle | Col A | Col B | Col C | Col D | Col E | Col F | Col G |
|---|---|---|---|---|---|---|---|
| 30 | 29 | 100 | | | | | |
| 31 | 29 | | 100 | | | | |
| 32 | 29 | | | 100 | | | |
| 33 | 29 | | | | 100 | | |
| 34 | 29 | | | | | 100 | |
| 35 | 29 | 80 | 20 | | | | |
| 36 | 29 | 80 | 20 | | | | |
| 37 | 29 | 80 | 20 | | | | |
| 38 | 29 | 80 | 20 | | | | |
| 39 | 29 | 80 | 20 | | | | |
| 40 | 29 | 80 | 20 | | | | |
| 41 | 29 | 80 | 20 | | | | |
| 42 | 29 | 80 | 20 | | | | |
| 43 | 29 | 80 | 20 | | | | |
| 44 | 29 | 80 | 20 | | | | |
| 45 | 29 | 80 | 20 | | | | |
| 46 | 29 | 80 | 20 | | | | |
| 47 | 29 | 80 | 20 | | | | |
| 48 | 29 | 80 | 20 | | | | |
| 49 | 29 | 80 | 20 | | | | |
| 50 | 29 | 80 | 20 | | | | |
| 51 | 29 | 80 | 20 | | | | |
| 52 | 29 | 80 | 20 | | | | |
| 53 | 29 | 80 | 20 | | | | |
| 54 | 29 | 80 | 20 | | | | |
| 55 | 29 | 80 | 20 | | | | |
| 56 | 29 | | | | 100 | | |
| 57 | 29 | | | | | | |
| 58 | | | | | | | |

| | Fluorescent dye | | Lightproof Agent | | | |
|---|---|---|---|---|---|---|
| Resin particle | Proportion of amount of charge (%) AY 73 | Percentage in resin particle (%) | Amount of charge (part) | Type | Percentage in resin particle (%) | particle size (nm) |
| 1 | | 5.0 | | | | 80 |
| 2 | | 5.0 | | | | 80 |
| 3 | | 5.0 | | | | 80 |
| 4 | | 5.0 | | | | 80 |
| 5 | | 5.0 | | | | 80 |
| 6 | | 5.0 | | | | 80 |
| 7 | | 5.0 | | | | 80 |
| 8 | | 5.0 | | | | 80 |
| 9 | | 5.0 | | | | 80 |
| 10 | | 5.0 | | | | 80 |
| 11 | | 5.0 | | | | 80 |
| 12 | | 5.0 | | | | 80 |
| 13 | | 5.0 | | | | 80 |
| 14 | | 5.0 | | | | 80 |
| 15 | | 5.0 | | | | 80 |
| 16 | | 5.0 | | | | 80 |
| 17 | | 5.0 | | | | 80 |
| 18 | | 5.0 | | | | 80 |
| 19 | | 5.0 | | | | 80 |
| 20 | | 5.0 | | | | 80 |
| 21 | | 5.0 | | | | 80 |
| 22 | | 5.0 | | | | 80 |
| 23 | | 5.0 | | | | 80 |
| 24 | | 5.0 | | | | 80 |
| 25 | | 3.0 | | | | 80 |
| 26 | | 4.0 | | | | 80 |
| 27 | | 8.0 | | | | 80 |
| 28 | | 10.0 | | | | 80 |
| 29 | | 5.0 | | | | 80 |
| 30 | | 5.0 | | | | 80 |
| 31 | | 5.0 | | | | 80 |
| 32 | | 5.0 | | | | 80 |
| 33 | | 5.0 | | | | 80 |
| 34 | | 5.0 | | | | 80 |
| 35 | | 5.0 | | | | 50 |
| 36 | | 5.0 | | | | 120 |
| 37 | | 5.0 | | | | 130 |

TABLE 1-2-continued

Preparation Condition and Property of Resin Particle

| | | | | | |
|---|---|---|---|---|---|
| 38 | | 5.0 | 5.8 | Lightproof Agent 1 | 1.0 | 80 |
| 39 | | 5.0 | 5.8 | Lightproof Agent 2 | 1.0 | 80 |
| 40 | | 5.0 | 5.8 | Lightproof Agent 3 | 1.0 | 80 |
| 41 | | 5.0 | 5.8 | Lightproof Agent 4 | 1.0 | 80 |
| 42 | | 5.0 | 5.8 | Lightproof Agent 5 | 1.0 | 80 |
| 43 | | 5.0 | 5.8 | Lightproof Agent 6 | 1.0 | 80 |
| 44 | | 5.0 | 5.8 | Lightproof Agent 7 | 1.0 | 80 |
| 45 | | 5.0 | | | | 80 |
| 46 | | 5.0 | | | | 80 |
| 47 | | 5.0 | | | | 80 |
| 48 | | 5.0 | | | | 80 |
| 49 | | 5.0 | | | | 80 |
| 50 | | 5.0 | | | | 80 |
| 51 | | 5.0 | | | | 80 |
| 52 | | 5.0 | | | | 80 |
| 53 | | 5.0 | | | | 80 |
| 54 | | 5.0 | | | | 80 |
| 55 | | 5.0 | | | | 80 |
| 56 | | 5.0 | | | | 80 |
| 57 | 100 | 5.0 | | | | 80 |
| 58 | | 0.0 | | | | 80 |

<Synthesis of Water-Soluble Resin>
(Water-Soluble Resins 1 to 8)

Monomers were polymerized according to an ordinary method to synthesize water-soluble acrylic resins, which are random copolymers having chemical compositions and characteristics summarized in Table 2. The anionic group was neutralized by adding an aqueous solution containing potassium hydroxide whose amount is equimolar to the acid value, and a proper amount of water was further added to obtain an aqueous solution of the water-soluble resin with a resin content of 10.0%. The water-soluble resin was dissolved in tetrahydrofuran to prepare a sample for measurement, and the sample was subjected to potentiometric titration using an automatic potentiometric titrator (Trade name "AT510", from Kyoto Electronics Manufacturing Co., Ltd.) and potassium hydroxide titration solution in ethanol, to thereby measure the acid value of the water-soluble resin. Each water-soluble resin was found to have a weight-average molecular weight, when measured by GPC on the polystyrene basis, of 10,000.

Abbreviations in Table 2 are as follows.
St: styrene
BzMA: benzyl methacrylate
BA: n-butyl acrylate
MAA: methacrylic acid
AA: acrylic acid

TABLE 2

Synthesis Condition and Property of Water-Soluble Resin

| Water-soluble resin | Unit (%) | | | | | Acid value (mgKOH/g) |
|---|---|---|---|---|---|---|
| | St | BzMA | BA | MAA | AA | |
| 1 | 60.0 | | 21.6 | 18.4 | | 120 |
| 2 | | 60.0 | 21.6 | 18.4 | | 120 |
| 3 | 60.0 | | 24.6 | | 15.4 | 120 |
| 4 | 60.0 | | 24.7 | 15.3 | | 100 |
| 5 | 60.0 | | 12.4 | 27.6 | | 180 |
| 6 | | | 81.6 | 18.4 | | 120 |
| 7 | 60.0 | | 26.2 | 13.8 | | 90 |
| 8 | 60.0 | | 10.8 | 29.2 | | 190 |

(Water-Soluble Resin 9)

A four-necked flask equipped with a thermometer, a stirrer, a nitrogen supply tube and a reflux tube was prepared. Into the flask, placed were 80.0 parts of toluene diisocyanate, 68.5 parts of polypropylene glycol with a number-average molecular weight of 2,000, 47.8 parts of dimethylol propionic acid and 300 parts of methyl ethyl ketone, and the content was allowed to react under a nitrogen gas atmosphere at 80° C. for 6 hours. Thereafter, 3.8 parts of ethylenediamine was added, and the content was allowed to react at 80° C. The content was then cooled down to 40° C., to which deionized water was added, and an aqueous solution of potassium hydroxide, whose amount is equimolar to the acid value of the resin, was then added while keeping the mixture stirred at high speed using a homomixer. After removing methyl ethyl ketone under reduced pressure, a proper amount of water was added, to thereby obtain an aqueous solution of a water-soluble resin 9 with a resin content of 10.0%. The water-soluble resin 9 was found to be a water-soluble urethane resin having an acid value of 100 mgKOH/g and a weight-average molecular weight of 18,000.

<Preparation of Ink>

The individual ingredients (in %) listed in the upper lines of Tables 3-1 to 3-4 were mixed, thoroughly stirred, and filtered under pressure through a microfilter (from FUJIFILM Corporation) with a pore size of 3.0 μm, to thereby prepare each ink. In Tables 3-1 to 3-4, "Acetylenol E100" is a trade name of a nonionic surfactant manufactured by Kawaken Fine Chemicals Co., Ltd. Lower lines of Tables 3-1 to 3-4 list properties of the inks. All of the thus prepared inks were found to have pH within the range from 8.5 to 9.0.

TABLE 3-1

Chemical Composition and Property of Ink

| | Example | | | | | | | | | |
|---|---|---|---|---|---|---|---|---|---|---|
| | 1 | 2 | 3 | 4 | 5 | 6 | 7 | 8 | 9 | 10 |
| Resin particle No. | 1 | 2 | 3 | 4 | 5 | 6 | 7 | 8 | 9 | 10 |
| Water-soluble resin No. | 1 | 1 | 1 | 1 | 1 | 1 | 1 | 1 | 1 | 1 |
| Aqueous dispersion of resin particle | 25.0 | 25.0 | 25.0 | 25.0 | 25.0 | 25.0 | 25.0 | 25.0 | 25.0 | 25.0 |
| Aqueous solution of water-soluble resin | 20.0 | 20.0 | 20.0 | 20.0 | 20.0 | 20.0 | 20.0 | 20.0 | 20.0 | 20.0 |
| C.I. Basic Red 1 | | | | | | | | | | |
| C.I. Basic Violet 11 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 34.0 |
| Content of Resin particle P (%) | 5.0 | 5.0 | 5.0 | 5.0 | 5.0 | 5.0 | 5.0 | 5.0 | 5.0 | 5.0 |
| Content of water-soluble resin S (%) | 2.0 | 2.0 | 2.0 | 2.0 | 2.0 | 2.0 | 2.0 | 2.0 | 2.0 | 2.0 |
| S/P value (times) | 0.4 | 0.4 | 0.4 | 0.4 | 0.4 | 0.4 | 0.4 | 0.4 | 0.4 | 0.4 |

| | Example | | | | | | | | | |
|---|---|---|---|---|---|---|---|---|---|---|
| | 11 | 12 | 13 | 14 | 15 | 16 | 17 | 18 | 19 | 20 |
| Resin particle No. | 11 | 12 | 1 | 1 | 1 | 1 | 1 | 13 | 14 | 15 |
| Water-soluble resin No. | 1 | 1 | 2 | 3 | 4 | 5 | 9 | 1 | 1 | 1 |
| Aqueous dispersion of resin particle | 25.0 | 25.0 | 25.0 | 25.0 | 25.0 | 25.0 | 25.0 | 25.0 | 25.0 | 25.0 |
| Aqueous solution of water-soluble resin | 20.0 | 20.0 | 20.0 | 20.0 | 20.0 | 20.0 | 20.0 | 20.0 | 20.0 | 20.0 |
| C.I. Basic Red 1 | | | | | | | | | | |
| C.I. Basic Violet 11 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 34.0 |
| Content of Resin particle P (%) | 5.0 | 5.0 | 5.0 | 5.0 | 5.0 | 5.0 | 5.0 | 5.0 | 5.0 | 5.0 |
| Content of water-soluble resin S (%) | 2.0 | 2.0 | 2.0 | 2.0 | 2.0 | 2.0 | 2.0 | 2.0 | 2.0 | 2.0 |
| S/P value (times) | 0.4 | 0.4 | 0.4 | 0.4 | 0.4 | 0.4 | 0.4 | 0.4 | 0.4 | 0.4 |

TABLE 3-2

Chemical Composition and Property of Ink

| | Example | | | | | | | | | |
|---|---|---|---|---|---|---|---|---|---|---|
| | 21 | 22 | 23 | 24 | 25 | 26 | 27 | 28 | 29 | 30 |
| Resin particle No. | 16 | 17 | 18 | 19 | 20 | 21 | 22 | 23 | 24 | 25 |
| Water-soluble resin No. | 1 | 1 | 1 | 1 | 1 | 1 | 1 | 1 | 1 | 1 |
| Aqueous dispersion of resin particle | 25.0 | 25.0 | 25.0 | 25.0 | 25.0 | 25.0 | 25.0 | 25.0 | 25.0 | 25.0 |

TABLE 3-2-continued

| Chemical Composition and Property of Ink | | | | | | | | | | |
|---|---|---|---|---|---|---|---|---|---|---|
| Aqueous solution of water-soluble resin | 20.0 | 20.0 | 20.0 | 20.0 | 20.0 | 20.0 | 20.0 | 20.0 | 20.0 | 20.0 |
| C.I. Basic Red 1 | | | | | | | | | | |
| C.I. Basic Violet 11 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 34.0 |
| Content of Resin particle P (%) | 5.0 | 5.0 | 5.0 | 5.0 | 5.0 | 5.0 | 5.0 | 5.0 | 5.0 | 5.0 |
| Content of water-soluble resin S (%) | 2.0 | 2.0 | 2.0 | 2.0 | 2.0 | 2.0 | 2.0 | 2.0 | 2.0 | 2.0 |
| S/P value (times) | 0.4 | 0.4 | 0.4 | 0.4 | 0.4 | 0.4 | 0.4 | 0.4 | 0.4 | 0.4 |

| | Example | | | | | | | | | |
|---|---|---|---|---|---|---|---|---|---|---|
| | 31 | 32 | 33 | 34 | 35 | 36 | 37 | 38 | 39 | 40 |
| Resin particle No. | 26 | 27 | 28 | 29 | 30 | 31 | 32 | 33 | 34 | 35 |
| Water-soluble resin No. | 1 | 1 | 1 | 1 | 1 | 1 | 1 | 1 | 1 | 1 |
| Aqueous dispersion of resin particle | 25.0 | 25.0 | 25.0 | 25.0 | 25.0 | 25.0 | 25.0 | 25.0 | 25.0 | 25.0 |
| Aqueous solution of water-soluble resin | 20.0 | 20.0 | 20.0 | 20.0 | 20.0 | 20.0 | 20.0 | 20.0 | 20.0 | 20.0 |
| C.I. Basic Red 1 | | | | | | | | | | |
| C.I. Basic Violet 11 | | | | | | | | | | |
| Glycerin | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 34.0 |
| Content of Resin particle P (%) | 5.0 | 5.0 | 5.0 | 5.0 | 5.0 | 5.0 | 5.0 | 5.0 | 5.0 | 5.0 |
| Content of water-soluble resin S (%) | 2.0 | 2.0 | 2.0 | 2.0 | 2.0 | 2.0 | 2.0 | 2.0 | 2.0 | 2.0 |
| S/P value (times) | 0.4 | 0.4 | 0.4 | 0.4 | 0.4 | 0.4 | 0.4 | 0.4 | 0.4 | 0.4 |

TABLE 3-3

| Chemical Composition and Property of Ink | | | | | | | | | | | | | | | | | | |
|---|---|---|---|---|---|---|---|---|---|---|---|---|---|---|---|---|---|---|
| | Example | | | | | | | | | | | | | | | | | |
| | 41 | 42 | 43 | 44 | 45 | 46 | 47 | 48 | 49 | 50 | 51 | 52 | 53 | 54 | 55 | 56 | 57 | 58 |
| Resin particle No. | 36 | 37 | 38 | 39 | 40 | 41 | 42 | 43 | 44 | 1 | 1 | 1 | 1 | 1 | 1 | 1 | 1 | 45 |
| Water-soluble resin No. | 1 | 1 | 1 | 1 | 1 | 1 | 1 | 1 | 1 | 1 | 1 | 1 | 1 | 1 | 1 | 1 | 1 | 1 |
| Aqueous dispersion of resin particle | 25.0 | 25.0 | 25.0 | 25.0 | 25.0 | 25.0 | 25.0 | 25.0 | 25.0 | 25.0 | 25.0 | 12.5 | 5.0 | 4.5 | 5.0 | 50.0 | 55.0 | 25.0 |
| Aqueous solution of water-soluble resin | 20.0 | 20.0 | 20.0 | 20.0 | 20.0 | 20.0 | 20.0 | 20.0 | 20.0 | 4.0 | 5.0 | 50.0 | 21.0 | 18.0 | 20.0 | 20.0 | 11.0 | 20.0 |

TABLE 3-3-continued

| | Chemical Composition and Property of Ink | | | | | | | | | | | | | | | | | |
|---|---|---|---|---|---|---|---|---|---|---|---|---|---|---|---|---|---|---|
| | Example | | | | | | | | | | | | | | | | | |
| | 41 | 42 | 43 | 44 | 45 | 46 | 47 | 48 | 49 | 50 | 51 | 52 | 53 | 54 | 55 | 56 | 57 | 58 |
| C.I. Basic Red 1 | | | | | | | | | | | | | | | | | | |
| C.I. Basic Violet 11 | | | | | | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 50.0 | 49.0 | 16.5 | 53.0 | 56.5 | 54.0 | 9.0 | 13.0 | 34.0 |
| Content of Resin particle P (%) | 5.0 | 5.0 | 5.0 | 5.0 | 5.0 | 5.0 | 5.0 | 5.0 | 5.0 | 5.0 | 5.0 | 2.5 | 1.0 | 0.9 | 1.0 | 10.0 | 11.0 | 5.0 |
| Content of water-soluble resin S (%) | 2.0 | 2.0 | 2.0 | 2.0 | 2.0 | 2.0 | 2.0 | 2.0 | 2.0 | 0.4 | 0.5 | 5.0 | 2.1 | 1.8 | 2.0 | 2.0 | 1.1 | 2.0 |
| S/P value (times) | 0.4 | 0.4 | 0.4 | 0.4 | 0.4 | 0.4 | 0.4 | 0.4 | 0.4 | 0.08 | 0.10 | 2.0 | 2.1 | 2.0 | 2.0 | 0.2 | 0.1 | 0.4 |

TABLE 3-4

| | Chemical Composition and Property of Ink | | | | | | | | | | | | | | | | | |
|---|---|---|---|---|---|---|---|---|---|---|---|---|---|---|---|---|---|---|
| | Comparative Example | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 |
| Resin particle No. | 46 | 47 | 48 | 49 | 50 | 51 | 52 | 53 | 54 | 55 | 56 | 57 | 58 | 1+58 | 1 | 1 | 1 | 1 |
| Water-soluble resin No. | 1 | 1 | 1 | 1 | 1 | 1 | 1 | 1 | 1 | 1 | 1 | 1 | 1 | — | — | 6 | 7 | 8 |
| Aqueous dispersion of resin particle | 25.0 | 25.0 | 25.0 | 25.0 | 25.0 | 25.0 | 25.0 | 25.0 | 25.0 | 25.0 | 25.0 | 25.0 | 25.0 | 25.0+8.0 | 25.0 | 25.0 | 25.0 | 25.0 |
| Aqueous solution of water-soluble resin | 20.0 | 20.0 | 20.0 | 20.0 | 20.0 | 20.0 | 20.0 | 20.0 | 20.0 | 20.0 | 20.0 | 20.0 | 20.0 | | | 20.0 | 20.0 | 20.0 |
| C.I. Basic Red 1 | | | | | | | | | | | | | | 0.4 | | | | |
| C.I. Basic Violet 11 | | | | | | | | | | | | | | 0.1 | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Pure water | 34.0 | 34.0 | 34.0 | 34.0 | 34.0 | 34.0 | 34.0 | 34.0 | 34.0 | 34.0 | 34.0 | 34.0 | 34.0 | 33.5 | 46.0 | 54.0 | 34.0 | 34.0 | 34.0 |
| Content of Resin particle P (%) | 5.0 | 5.0 | 5.0 | 5.0 | 5.0 | 5.0 | 5.0 | 5.0 | 5.0 | 5.0 | 5.0 | 5.0 | 5.0 | 6.6 | 5.0 | 5.0 | 5.0 | 5.0 |
| Content of water-soluble resin S (%) | 2.0 | 2.0 | 2.0 | 2.0 | 2.0 | 2.0 | 2.0 | 2.0 | 2.0 | 2.0 | 2.0 | 2.0 | 2.0 | 0.0 | 0.0 | 2.0 | 2.0 | 2.0 |
| S/P value (times) | 0.4 | 0.4 | 0.4 | 0.4 | 0.4 | 0.4 | 0.4 | 0.4 | 0.4 | 0.4 | 0.4 | 0.4 | 0.4 | 0.0 | 0.0 | 0.4 | 0.4 | 0.4 |

<Evaluation>

Each of the thus prepared inks was filled in the ink cartridge, and mounted on an ink jet recording apparatus (Trade name "PIXUS Pro-10", from Canon Inc.) equipped with a recording head that ejects ink with the aid of heat energy. With such ink jet recording apparatus, a recording duty of 100% is defined when an image is recorded in a unit area of 1/600 inch×1/600 inch, by applying 8 ink droplets, each droplet having a mass of 3.8 ng±10%. Recording was carried out in an environment with a temperature of 25° C. and a relative humidity of 55%. In the evaluation criteria for the individual items below, "A" and "B" were considered to represent acceptable levels in the present invention, and "C" was considered to represent an unacceptable level. Evaluation results are summarized in Table 4.

(Color Developability)

Using the aforementioned ink jet recording apparatus, an image containing a gradation pattern described below was recorded on a recording medium (glossy paper, trade name "Canon Photo Paper Pro Luster", from Canon Inc.). The gradation pattern is composed of 2 cm×2 cm solid images with stepwise variation in the amount of applied ink, recorded so that 6 droplets at maximum of the ink is applied in a unit area of 1/600 inch×1/600 inch. The recorded image was dried for one day, and measured regarding hue angle (H), chroma (C*), and lightness (L*) in the Lab color system, using a spectrometric colorimeter (Trade name "X-Rite eXact" (M1 light source), from X-Rite Inc.). Color developability of the image was evaluated according to the evaluation criteria below. Lightness was evaluated by a value measured at a chroma of 50. In a case where the maximum chroma falls below 50, data obtained by measuring the gradation pattern was extrapolated to find a calculative lightness value for evaluation. Different types of evaluation criteria were employed depending on hue angles, since the hue visually sensed as favorable varies depending on spectral regions.

[For Hue Angle of 0° or more to Less than 180°]

A: Maximum chroma was 60 or more and lightness was 80 or more, or, maximum chroma was 50 or more and lightness was 85 or more.

B: Maximum chroma ranged from 50 or more to less than 60, and lightness ranged from 80 or more to less than 85.

C: Maximum chroma was less than 50, or, lightness was less than 80.

[For Hue Angle of 180° or more to Less than 360°]

A: Maximum chroma was 60 or more and lightness was 70 or more, or, maximum chroma was 50 or more and lightness was 75 or more.

B: Maximum chroma ranged from 50 or more to less than 60, and lightness ranged from 70 or more to less than 75.

C: Maximum chroma was less than 50, or, lightness was less than 70.

(Ejection Stability)

Using the aforementioned ink jet recording apparatus, a 19 cm×26 cm solid image with a recording duty of 100% was recorded on each of 10 sheets of recording medium (plain paper, trade name "GF-500" from Canon Inc.). The solid image on each of the 5th and 10th recording media was visually observed, and the ejection stability was evaluated according to the evaluation criteria below.

A: While the 5th sheet showed neither white streak nor blurring, the 10th sheet showed slight white streak and blurring.

B: While the 5th sheet showed neither white streak nor blurring, the 10th sheet showed white streak and blurring.

C: The 5th sheet showed white streak and blurring.

(Sticking Recoverability)

The processes below were carried out using the aforementioned ink jet recording apparatus. The ink jet recording apparatus was restored (cleaned) as operated from the printer driver, and a nozzle check pattern of the ink jet recording apparatus was recorded. Then the power cable was unplugged while the carriage is moving (when the recording head does not reside at the home position), so as to leave the recording head uncapped. The ink jet recording apparatus was then allowed to stand in this state, in an environment with a temperature of 30° C. and a relative humidity of 10%, for 14 days. The ink jet recording apparatus was then allowed to stand in an environment with a temperature of 25° C. for 6 hours, and nozzle check patterns were recorded while repeating the recovering operation (cleaning). The thus recorded nozzle check patterns were observed, and the sticking recoverability was evaluated according to the evaluation criteria shown below.

A: Normal recording enabled after recovering operations repeated 3 to 5 times.

B: Normal recording enabled after recovering operations repeated 6 to 10 times.

C: Normal recording was not enabled even after recovering operations repeated 11 times.

TABLE 4

| | | Evaluation Results | | |
| --- | --- | --- | --- | --- |
| | | Color developability | Ejection stability | Sticking recoverability |
| Example | 1 | A | A | A |
| | 2 | A | A | A |
| | 3 | A | A | A |
| | 4 | A | A | A |
| | 5 | A | A | A |
| | 6 | A | A | A |
| | 7 | A | A | A |
| | 8 | A | A | A |
| | 9 | A | A | A |
| | 10 | A | A | A |
| | 11 | A | A | A |
| | 12 | A | A | A |
| | 13 | A | A | A |
| | 14 | A | A | A |
| | 15 | A | A | A |
| | 16 | A | A | A |
| | 17 | A | A | A |
| | 18 | B | A | A |
| | 19 | A | A | A |
| | 20 | A | A | A |
| | 21 | A | A | B |
| | 22 | A | B | A |
| | 23 | A | A | A |
| | 24 | A | A | A |
| | 25 | A | A | B |
| | 26 | A | A | B |
| | 27 | A | A | B |
| | 28 | A | A | B |
| | 29 | A | A | B |
| | 30 | B | A | A |
| | 31 | A | A | A |
| | 32 | A | A | A |
| | 33 | B | A | A |
| | 34 | A | A | A |
| | 35 | A | A | A |
| | 36 | A | A | A |
| | 37 | A | A | A |
| | 38 | A | A | A |
| Example | 39 | A | A | A |
| | 40 | A | A | A |
| | 41 | A | A | A |
| | 42 | B | A | A |
| | 43 | A | A | A |
| | 44 | A | A | A |

TABLE 4-continued

Evaluation Results

| | | Color developability | Ejection stability | Sticking recoverability |
|---|---|---|---|---|
| | 45 | A | A | A |
| | 46 | A | A | A |
| | 47 | A | A | A |
| | 48 | A | A | A |
| | 49 | A | A | A |
| | 50 | A | B | A |
| | 51 | A | A | A |
| | 52 | A | A | A |
| | 53 | A | A | B |
| | 54 | B | A | A |
| | 55 | A | A | A |
| | 56 | A | A | A |
| | 57 | A | B | A |
| | 58 | A | B | A |
| | 1 | A | C | C |
| Comparative Example | 2 | C | A | C |
| | 3 | A | A | C |
| | 4 | C | A | A |
| | 5 | A | A | C |
| | 6 | A | C | C |
| | 7 | A | A | C |
| | 8 | A | A | C |
| | 9 | A | A | C |
| | 10 | A | C | A |
| | 11 | C | A | A |
| | 12 | C | A | A |
| | 13 | C | A | A |
| | 14 | A | C | A |
| | 15 | C | C | A |
| | 16 | A | C | A |
| | 17 | A | C | A |
| | 18 | A | A | C |

(Light Resistance)

Using the aforementioned ink jet recording apparatus, a 2 cm×2 cm solid image with a recording duty of 100% was recorded on each of two sheets of recording medium (plain paper, trade name "GF-500" from Canon Inc.). One of the thus obtained solid images was irradiated with xenon light in a xenon test apparatus (Trade name "ATLAS WEATHER-OMETER Ci4000", from Toyo Seiki Seisaku-sho, Ltd.), at a temperature of 50° C., a relative humidity of 70%, an irradiation intensity of 0.39 W/m$^2$ for 3 hours. The solid image thus irradiated with xenon light was then visually compared with the solid image not irradiated with xenon light. Results revealed that Examples 43 to 49 were suppressed from fading, as compared with other Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-122709, filed Jul. 1, 2019, Japanese Patent Application No. 2019-122710, filed Jul. 1, 2019, and Japanese Patent Application No. 2020-092292, filed May 27, 2020, which are hereby incorporated by reference herein in their entirety.

What is claimed is:

1. An aqueous ink for inkjet, comprising a resin particle dyed with a fluorescent dye, and a water-soluble resin,
wherein the fluorescent dye comprises a fluorescence-emitting dye selected from the group consisting of a basic dye, a disperse dye and an oil-soluble dye,
wherein the resin particle comprises (i) a core portion that contains an aromatic group-containing unit and a cyano group-containing unit, and (ii) a shell portion that contains an aromatic group-containing unit, an anionic group-containing unit, and a crosslinking agent-derived unit, but free of a cyano group-containing unit,
wherein a percentage (% by mass) of the crosslinking agent-derived unit in the shell portion is 30% by mass or more to 80% by mass or less,
wherein the water-soluble resin comprises an aromatic group-containing unit and an anionic group-containing unit, and
wherein the water-soluble resin has an acid value of 100 mgKOH/g or more to 180 mgKOH/g or less.

2. The aqueous ink according to claim 1, wherein a percentage (% by mass) of the cyano group-containing unit in the core portion is 10% by mass or more to 60% by mass or less.

3. The aqueous ink according to claim 1, wherein a percentage (% by mass) of the anionic group-containing unit in the shell portion is 5% by mass or more to 30% by mass or less.

4. The aqueous ink according to claim 1, wherein the aromatic group-containing unit contained in the core portion, and the aromatic group-containing unit contained in the shell portion are units of the same kind.

5. The aqueous ink according to claim 1, wherein the crosslinking agent contains two or more kinds of crosslinking agent, and at least one kind of the crosslinking agent is a glycidyl group-containing crosslinking agent.

6. The aqueous ink according to claim 1, wherein a percentage (% by mass) of the fluorescent dye in the resin particle is 3.0% by mass or more to 8.0% by mass or less.

7. The aqueous ink according to claim 1, wherein the fluorescent dye contains two or more kinds of fluorescent dye.

8. The aqueous ink according to claim 1, wherein the resin particle has a cumulative 50% particle diameter in volume-based particle size distribution of 120 nm or less.

9. The aqueous ink according to claim 1, wherein a content (% by mass) of the water-soluble resin, when expressed in mass ratio relative to a content (% by mass) of the resin particle, is 0.1 times or more to 2.0 times or less.

10. The aqueous ink according to claim 1, wherein a content (% by mass) of the resin particle is 1.0% by mass or more to 10.0% by mass or less based on the total mass of ink.

11. An ink cartridge comprising an ink, and an ink storage portion that stores the ink, the ink being the aqueous ink according to claim 1.

12. An ink jet recording method by which an image is recorded on a recording medium with an ink ejected from a recording head of an ink jet system, the ink being the aqueous ink according to claim 1.

13. The aqueous ink according to claim 1, wherein the resin particle has a cumulative 50% particle diameter in volume-based particle size distribution of 50 nm or more.

14. The aqueous ink according to claim 1, wherein the basic dye has a xanthene skeleton or a coumarin skeleton.

15. The aqueous ink according to claim 1, wherein the disperse dye has a coumarin skeleton or an anthraquinone skeleton.

16. The aqueous ink according to claim 1, wherein the oil-soluble dye has a coumarin skeleton or a xanthene skeleton.

17. The aqueous ink according to claim 1, wherein a content (% by mass) of the fluorescent dye in the aqueous ink is 0.1% by mass or more to 5.0% by mass or less based on the total mass of ink.

18. The aqueous ink according to claim 1, wherein a percentage (% by mass) of the fluorescent dye in the resin particle is 1.0% by mass or more to 15.0% by mass or less based on the total mass of ink.

19. The aqueous ink according to claim 1, wherein the water-soluble resin is at least one of an acrylic resin and a urethane resin.

20. The aqueous ink according to claim 1, wherein a content (% by mass) of the water-soluble resin in the ink is 0.1% by mass or more to 5.0% by mass or less based on the total mass of ink.

* * * * *